(12) United States Patent
Deckard et al.

(10) Patent No.: US 12,257,929 B2
(45) Date of Patent: Mar. 25, 2025

(54) VEHICLE SEATING ARRANGEMENTS

(71) Applicant: Polaris Industries Inc., Medina, MN (US)

(72) Inventors: Aaron D. Deckard, Zionsville, IN (US); Travis J. Saari, Eau Claire, WI (US); Rory A. Lindeberg, Wyoming, MN (US); Scott A. Miller, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/498,160

(22) Filed: Oct. 31, 2023

(65) Prior Publication Data
US 2024/0059193 A1    Feb. 22, 2024

Related U.S. Application Data

(60) Continuation of application No. 17/579,306, filed on Jan. 19, 2022, now Pat. No. 11,827,122, which is a
(Continued)

(51) Int. Cl.
*B60N 2/30* (2006.01)
*B60N 2/01* (2006.01)
(Continued)

(52) U.S. Cl.
CPC .............. *B60N 2/01* (2013.01); *B60N 2/062* (2013.01); *B60N 2/065* (2013.01); *B60N 2/206* (2013.01);
(Continued)

(58) Field of Classification Search
CPC ................. B60N 2/3025; B60N 2/305; B60N 2002/0216; B60N 2/062
(Continued)

(56) References Cited

U.S. PATENT DOCUMENTS

| | | | |
|---|---|---|---|
| 308 A | | 7/1837 | Winans |
| 625,690 A | * | 5/1899 | Kinsey ..................... A47C 7/66 |
| | | | 297/184.15 |

(Continued)

FOREIGN PATENT DOCUMENTS

| | | |
|---|---|---|
| CN | 101646582 A | 2/2010 |
| CN | 203806046 U | 9/2014 |

(Continued)

OTHER PUBLICATIONS

International Preliminary Report on Patentability issued by The International Bureau of WIPO, dated Jul. 14, 2020, for International Patent Application No. PCT/US2019/012868; 10 pages.
(Continued)

*Primary Examiner* — Hilary L Gutman
(74) *Attorney, Agent, or Firm* — Faegre Drinker Biddle & Reath LLP

(57) ABSTRACT

A seating arrangement for a vehicle is shown to include a plurality of seats, including at least two front seats, at least two rear seats, and a rear jump seat positioned intermediate the two rear seats. The jump seat comprises a seat back which is positioned rearwardly of the rear seats, and the rear seats are movable laterally between a first position where the rear seats are proximate to each other and generally covering the seat back of the jump seat, and a second position where the rear seats are spaced apart from each other and the seat back of the jump seat is exposed. The arrangement may also include rear seats which are rotatable relative to the seat backs to provide a storage surface.

9 Claims, 36 Drawing Sheets

Related U.S. Application Data division of application No. 16/242,626, filed on Jan. 8, 2019, now Pat. No. 11,260,773.

(60) Provisional application No. 62/615,142, filed on Jan. 9, 2018.

(51) Int. Cl.
| | |
|---|---|
| *B60N 2/02* | (2006.01) |
| *B60N 2/06* | (2006.01) |
| *B60N 2/20* | (2006.01) |
| *B60N 2/26* | (2006.01) |
| *B60N 2/38* | (2006.01) |
| *B60N 2/56* | (2006.01) |
| *B60N 3/10* | (2006.01) |

(52) U.S. Cl.
CPC .............. *B60N 2/26* (2013.01); *B60N 2/3025* (2013.01); *B60N 2/305* (2013.01); *B60N 2/3063* (2013.01); *B60N 2/3093* (2013.01); *B60N 2/38* (2013.01); *B60N 2/5621* (2013.01); *B60N 2/5657* (2013.01); *B60N 3/102* (2013.01); *B60N 3/104* (2013.01); *B60N 2002/0216* (2013.01); *B60N 2205/35* (2013.01)

(58) Field of Classification Search
USPC ..................................................... 296/65.01
See application file for complete search history.

(56) References Cited

U.S. PATENT DOCUMENTS

| | | | | |
|---|---|---|---|---|
| 2,502,061 A * | 3/1950 | Radford | .................. | B60N 2/305 296/156 |
| 2,800,947 A | 7/1957 | Thiem | | |
| 2,865,427 A * | 12/1958 | Garfield | .................. | B60N 2/245 297/311 |
| 3,227,488 A * | 1/1966 | Kosbab | .................. | B60N 2/366 296/65.09 |
| 3,379,455 A | 4/1968 | Dahlstrom | | |
| 3,704,029 A | 11/1972 | Bailleux | | |
| 3,709,314 A | 1/1973 | Hickey | | |
| 3,804,055 A | 4/1974 | Nishikawa et al. | | |
| 3,901,092 A | 8/1975 | Romick | | |
| 3,916,639 A | 11/1975 | Atkinson | | |
| 4,373,604 A | 2/1983 | Lunn et al. | | |
| 4,381,828 A | 5/1983 | Lunn et al. | | |
| 4,422,691 A * | 12/1983 | Vogel | .................. | B60N 2/686 297/232 |
| 4,632,207 A | 12/1986 | Moore | | |
| 4,699,418 A * | 10/1987 | Plavetich | .............. | B60N 2/3011 296/65.09 |
| 4,758,018 A | 7/1988 | Takizawa et al. | | |
| 4,761,036 A * | 8/1988 | Vogel | ...................... | B60N 2/06 297/440.22 |
| 4,932,709 A * | 6/1990 | Wainwright | ......... | B60N 2/0292 296/65.09 |
| 4,969,661 A | 11/1990 | Omura et al. | | |
| 4,986,566 A | 1/1991 | Nishino et al. | | |
| 4,989,894 A | 2/1991 | Winsor et al. | | |
| 5,098,156 A * | 3/1992 | Vogel | ...................... | B60N 2/242 297/344.1 |
| 5,176,398 A | 1/1993 | Kanai et al. | | |
| 5,215,329 A | 6/1993 | Santo | | |
| 5,246,270 A * | 9/1993 | Vogel | ...................... | B60N 2/06 297/344.1 |
| 5,269,589 A | 12/1993 | Brothers et al. | | |
| 5,516,179 A | 5/1996 | Tidwell | | |
| 5,730,496 A * | 3/1998 | Hashimoto | .............. | B60N 2/36 297/335 |
| 6,000,296 A | 12/1999 | Sundquist | | |
| 6,003,950 A | 12/1999 | Larsson | | |
| 6,010,194 A * | 1/2000 | Cykon | ..................... | B60N 2/38 297/440.22 |
| 6,129,405 A | 10/2000 | Miyahara et al. | | |
| 6,273,510 B1 * | 8/2001 | Ehemann | .................. | B60N 2/68 297/440.22 |
| 6,386,629 B1 | 5/2002 | Severinski et al. | | |
| 6,648,393 B1 | 11/2003 | Milnar et al. | | |
| 6,702,309 B2 | 3/2004 | Cho | | |
| 6,799,781 B2 | 10/2004 | Rasidescu et al. | | |
| 6,851,691 B2 | 2/2005 | Rasidescu et al. | | |
| 7,104,580 B2 | 9/2006 | Clark et al. | | |
| 7,108,319 B2 | 9/2006 | Hartwich et al. | | |
| 7,192,088 B1 * | 3/2007 | Trombley | ............ | B60N 2/3079 297/335 |
| 7,410,182 B1 | 8/2008 | Giese et al. | | |
| 7,467,823 B2 | 12/2008 | Hartwich | | |
| 7,510,227 B2 * | 3/2009 | Mahaffy | ............ | B60N 2/01508 296/65.09 |
| 7,635,138 B2 | 12/2009 | Imre et al. | | |
| 7,654,544 B2 | 2/2010 | Lounsberry et al. | | |
| 7,748,766 B2 | 7/2010 | Villeminey | | |
| 7,784,805 B2 | 8/2010 | Morgan | | |
| 7,798,505 B2 | 9/2010 | Neag et al. | | |
| 7,828,050 B2 | 11/2010 | Esaki | | |
| 7,837,203 B1 | 11/2010 | Schmidt et al. | | |
| 7,891,684 B1 | 2/2011 | Luttinen et al. | | |
| 8,109,308 B2 | 2/2012 | Manesh et al. | | |
| 8,176,957 B2 | 5/2012 | Manesh et al. | | |
| 8,235,462 B2 | 8/2012 | Bajic et al. | | |
| 8,328,235 B2 | 12/2012 | Schneider et al. | | |
| 8,517,135 B2 | 8/2013 | Schapf et al. | | |
| 8,678,464 B2 * | 3/2014 | Smith | .................... | B60N 2/502 297/195.13 |
| 8,727,057 B2 | 5/2014 | Park et al. | | |
| 8,746,719 B2 | 6/2014 | Safranski et al. | | |
| 8,764,039 B2 | 7/2014 | Keller et al. | | |
| 8,944,449 B2 | 2/2015 | Hurd et al. | | |
| 8,950,824 B2 | 2/2015 | Eck et al. | | |
| 9,108,470 B2 | 8/2015 | Tercha et al. | | |
| 9,180,801 B2 | 11/2015 | Kennedy et al. | | |
| 9,393,894 B2 | 7/2016 | Steinmetz et al. | | |
| 9,566,858 B2 | 2/2017 | Hicke et al. | | |
| 9,713,975 B2 | 7/2017 | Berry et al. | | |
| 9,738,191 B2 | 8/2017 | Langensiepen et al. | | |
| 9,764,039 B2 | 9/2017 | Thanos | | |
| 9,776,481 B2 | 10/2017 | Deckard et al. | | |
| 9,908,445 B2 * | 3/2018 | Park | ...................... | B60N 2/309 |
| 9,981,519 B2 | 5/2018 | Despres-Nadeau et al. | | |
| 10,604,038 B2 | 3/2020 | Li et al. | | |
| 11,027,631 B2 | 6/2021 | Hoshi et al. | | |
| 11,260,773 B2 | 3/2022 | Deckard et al. | | |
| 11,285,807 B2 | 3/2022 | Galsworthy et al. | | |
| 11,584,179 B2 | 2/2023 | Brady et al. | | |
| 2002/0005649 A1 * | 1/2002 | Hofmann | ............... | B60N 2/305 297/188.1 |
| 2002/0040822 A1 | 4/2002 | Gagnon et al. | | |
| 2003/0038444 A1 | 2/2003 | Chang | | |
| 2003/0085062 A1 | 5/2003 | Bowen | | |
| 2003/0102699 A1 | 6/2003 | Aoki et al. | | |
| 2004/0129489 A1 | 7/2004 | Brasseal et al. | | |
| 2004/0135338 A1 | 7/2004 | Asteggiano | | |
| 2004/0195797 A1 | 10/2004 | Nash et al. | | |
| 2004/0222657 A1 | 11/2004 | Welch et al. | | |
| 2005/0006868 A1 | 1/2005 | Ziech et al. | | |
| 2005/0035618 A1 | 2/2005 | Toth et al. | | |
| 2005/0073126 A1 | 4/2005 | Seki | | |
| 2005/0113203 A1 | 5/2005 | Mueller et al. | | |
| 2005/0140110 A1 | 6/2005 | Lee et al. | | |
| 2005/0275183 A1 | 12/2005 | Amano | | |
| 2006/0091636 A1 | 5/2006 | Shelton | | |
| 2006/0138812 A1 | 6/2006 | Aoki | | |
| 2006/0220411 A1 | 10/2006 | Pathak et al. | | |
| 2006/0237938 A1 | 10/2006 | Imre et al. | | |
| 2006/0283654 A1 | 12/2006 | Krisher | | |
| 2006/0289217 A1 | 12/2006 | Schlaf et al. | | |
| 2007/0007742 A1 | 1/2007 | Allen et al. | | |
| 2007/0075577 A1 * | 4/2007 | Trombley | ............ | B60N 2/305 297/335 |
| 2007/0096420 A1 | 5/2007 | Lounsberry et al. | | |

(56) References Cited

U.S. PATENT DOCUMENTS

| | | | |
|---|---|---|---|
| 2007/0114747 A1 | 5/2007 | Morgan | |
| 2007/0157899 A1 | 7/2007 | Seufert et al. | |
| 2007/0176386 A1 | 8/2007 | Schlangen et al. | |
| 2008/0135320 A1 | 6/2008 | Matthies | |
| 2008/0143159 A1* | 6/2008 | Song | B60N 2/3065 |
| | | | 297/317 |
| 2009/0072572 A1 | 3/2009 | Scheinberg | |
| 2009/0195037 A1 | 8/2009 | Plavetich et al. | |
| 2009/0243325 A1 | 10/2009 | Villeminey | |
| 2010/0244396 A1 | 9/2010 | Onda et al. | |
| 2011/0062738 A1 | 3/2011 | Lindley et al. | |
| 2011/0109128 A1 | 5/2011 | Axakov et al. | |
| 2011/0133533 A1 | 6/2011 | Herzberg | |
| 2011/0227385 A1 | 9/2011 | Holder | |
| 2012/0018771 A1 | 1/2012 | Yamazaki et al. | |
| 2012/0031688 A1 | 2/2012 | Safranski et al. | |
| 2012/0187740 A1 | 7/2012 | Kim | |
| 2013/0105238 A1 | 5/2013 | Hall et al. | |
| 2013/0213157 A1 | 8/2013 | Martin et al. | |
| 2013/0240272 A1 | 9/2013 | Gass et al. | |
| 2013/0277937 A1 | 10/2013 | Keller et al. | |
| 2013/0337951 A1 | 12/2013 | Hasewend et al. | |
| 2014/0025246 A1 | 1/2014 | Hall et al. | |
| 2014/0077536 A1* | 3/2014 | Mather | B60N 2/3031 |
| | | | 297/313 |
| 2014/0103627 A1 | 4/2014 | Deckard et al. | |
| 2014/0124279 A1 | 5/2014 | Schlangen et al. | |
| 2014/0125025 A1 | 5/2014 | Lee et al. | |
| 2014/0251712 A1 | 9/2014 | Brady et al. | |
| 2014/0345964 A1 | 11/2014 | Nakaoka et al. | |
| 2015/0061251 A1 | 3/2015 | Yamada et al. | |
| 2015/0061275 A1 | 3/2015 | Deckard et al. | |
| 2015/0183286 A1 | 7/2015 | Bruehl et al. | |
| 2015/0274171 A1 | 10/2015 | Makabe et al. | |
| 2015/0343900 A1 | 12/2015 | Schlangen et al. | |
| 2016/0039260 A1 | 2/2016 | Randle | |
| 2016/0176318 A1* | 6/2016 | Poulos | B60N 2/062 |
| | | | 297/235 |
| 2016/0305531 A1 | 10/2016 | Martin et al. | |
| 2016/0347137 A1 | 12/2016 | Despres-Nadeau et al. | |
| 2017/0008438 A1 | 1/2017 | Clark et al. | |
| 2017/0029035 A1 | 2/2017 | Dube et al. | |
| 2017/0057351 A1 | 3/2017 | Bandy | |
| 2017/0075476 A1 | 3/2017 | Kwon et al. | |
| 2017/0080977 A1 | 3/2017 | Schroeder et al. | |
| 2017/0136874 A1 | 5/2017 | Harris et al. | |
| 2017/0166255 A1 | 6/2017 | Peterson et al. | |
| 2017/0225563 A1 | 8/2017 | Hwang | |
| 2018/0147902 A1 | 5/2018 | Hu et al. | |
| 2018/0264902 A1 | 9/2018 | Schroeder et al. | |
| 2018/0281861 A1 | 10/2018 | Gordon | |
| 2018/0312025 A1 | 11/2018 | Danielson et al. | |
| 2018/0326843 A1 | 11/2018 | Danielson et al. | |
| 2019/0093745 A1 | 3/2019 | Younggren et al. | |
| 2019/0152357 A1 | 5/2019 | Harrison et al. | |
| 2019/0193501 A1 | 6/2019 | Brady et al. | |
| 2019/0210457 A1 | 7/2019 | Galsworthy et al. | |
| 2019/0210484 A1 | 7/2019 | Deckard et al. | |
| 2019/0211915 A1 | 7/2019 | Davis et al. | |
| 2019/0248405 A1 | 8/2019 | Bennett et al. | |
| 2020/0017142 A1 | 1/2020 | Buchwitz et al. | |
| 2020/0025275 A1 | 1/2020 | Schroeder et al. | |
| 2020/0130450 A1 | 4/2020 | Nakashima et al. | |
| 2021/0213794 A1 | 7/2021 | Brady et al. | |
| 2021/0339591 A1 | 11/2021 | Li et al. | |
| 2021/0394579 A1 | 12/2021 | Jang | |
| 2022/0055434 A1 | 2/2022 | Hansen et al. | |
| 2022/0134907 A1 | 5/2022 | Deckard et al. | |
| 2022/0227191 A1 | 7/2022 | Dong et al. | |
| 2022/0250469 A1 | 8/2022 | Galsworthy et al. | |
| 2022/0348118 A1* | 11/2022 | Curts | B63B 29/06 |
| 2023/0013065 A1 | 1/2023 | Brady et al. | |
| 2023/0038448 A1 | 2/2023 | Okuyama et al. | |
| 2023/0060635 A1 | 3/2023 | Feltham et al. | |
| 2023/0158848 A1 | 5/2023 | Scheuerell et al. | |
| 2023/0322033 A1 | 10/2023 | Brady et al. | |
| 2023/0347701 A1 | 11/2023 | Heon et al. | |

FOREIGN PATENT DOCUMENTS

| | | | | |
|---|---|---|---|---|
| CN | 111516560 B | * | 12/2021 | B60N 2/062 |
| CN | 112805177 B | | 2/2023 | |
| DE | 3147045 A1 | * | 5/1983 | |
| DE | 10252155 A1 | | 5/2004 | |
| DE | 102006061331 A1 | | 11/2007 | |
| DE | 102006061816 A1 | | 6/2008 | |
| DE | 102007048700 A1 | | 4/2009 | |
| DE | 102008029261 A1 | | 12/2009 | |
| DE | 102015222761 A1 | | 5/2017 | |
| EP | 42565 A | * | 12/1981 | B60N 2/682 |
| EP | 263189 A1 | * | 4/1988 | |
| EP | 443065 A | * | 8/1991 | B60N 2/242 |
| EP | 491987 A1 | * | 7/1992 | B60N 2/242 |
| FR | 2443964 A1 | | 7/1980 | |
| FR | 2645810 A1 | | 10/1990 | |
| FR | 2704494 A1 | | 11/1994 | |
| FR | 2818205 A1 | | 6/2002 | |
| FR | 2834945 A1 | | 7/2003 | |
| FR | 2886587 A1 | | 12/2006 | |
| FR | 2886593 A1 | | 12/2006 | |
| FR | 2889122 A1 | | 2/2007 | |
| FR | 2889825 A3 | | 2/2007 | |
| FR | 2921025 A1 | * | 3/2009 | B60N 2/3011 |
| FR | 2949214 A1 | | 2/2011 | |
| GB | 2388313 A | | 11/2003 | |
| JP | 62-134130 A | | 6/1987 | |
| JP | 62-134310 A | | 6/1987 | |
| JP | 63-101112 A | | 5/1988 | |
| JP | 63-134310 A | | 6/1988 | |
| JP | H07164942 A | * | 6/1995 | |
| JP | 2003-080982 A | | 3/2003 | |
| KR | 200190282 Y1 | * | 7/2000 | |
| KR | 10-2510622 B1 | | 3/2023 | |
| WO | WO-2014042915 A1 | * | 3/2014 | B60N 2/3031 |
| WO | 2015/190274 A1 | | 12/2015 | |
| WO | 2020/117633 A1 | | 6/2020 | |

OTHER PUBLICATIONS

International Preliminary Report on Patentability issued by The International Bureau of WIPO, dated Jul. 7, 2020, for International Patent Application No. PCT/US2019/012276; 7 pages.

International Preliminary Report on Patentability issued by The International Bureau of WIPO, dated Jun. 23, 2020, for International Patent Application No. PCT/US2018/066774; 13 pages.

International Preliminary Report on Patentability received for PCT Patent Application No. PCT/US2018/066774, mailed on Jul. 2, 2020, 14 pages.

International Preliminary Report on Patentability received for PCT Patent Application No. PCT/US2019/012276, mailed on Jul. 16, 2020, 8 pages.

International Preliminary Report on Patentability received for PCT Patent Application No. PCT/US2019/012868, mailed on Jul. 23, 2020, 11 pages.

International Search Report and Written Opinion issued by the European Patent Office, mailed Mar. 26, 2019, for International Patent Application No. PCT/US2019/012276; 9 pages.

International Search Report and Written Opinion issued by the European Patent Office, mailed May 27, 2019, for International Patent Application No. PCT/US2018/066774; 19 pages.

International Search Report and Written Opinion received for PCT Patent Application No. PCT/US2018/066774, mailed on May 27, 2019, 19 pages.

International Search Report and Written Opinion received for PCT Patent Application No. PCT/US2019/012276, mailed on Mar. 26, 2019, 9 pages.

International Search Report issued by the European Patent Office, mailed Jul. 5, 2019, for International Patent Application No. PCT/US2019/012868; 6 pages.

(56) References Cited

OTHER PUBLICATIONS

Invitation to Pay Additional Fees and Annex to Form PCT/ISA/206 issued by the European Patent Office, mailed Apr. 1, 2019, for International Patent Application No. PCT/US2018/066774; 16 pages.
Invitation to Pay Additional Fees and Annex to Form PCT/ISA/206, issued by the European Patent Office, mailed Apr. 4, 2019, for International Patent Application No. PCT/2018/066774; 16 pages.
Machine translation of FR '122 from espacement. com http://translationportal.epo.org/emtp/translate/?ACTION=description-retrieval&COUNTRY=FR&ENGINE=google&FORMAT=docdb&KIND=A1&LOCALE=en_EP&NUMBER=2889122&OPS=ops.epo.org/3.2&SRCLANG=fr&TRGLANG=en (Year: 2007).
Machine translation of FR 2889122 (Year: 2007).
Office Action issued by the Canadian Intellectual Property Office, dated Aug. 19, 2021, for Canadian Patent Application No. 3,088,961; 5 pages.
Office Action issued by the Canadian Intellectual Property Office, dated Jul. 30, 2021, for Canadian Patent Application No. 3,088,883; 3 pages.
Written Opinion issued by the European Patent Office, mailed Jul. 5, 2019, for International Patent Application No. PCT/US2019/012868; 11 pages.

\* cited by examiner

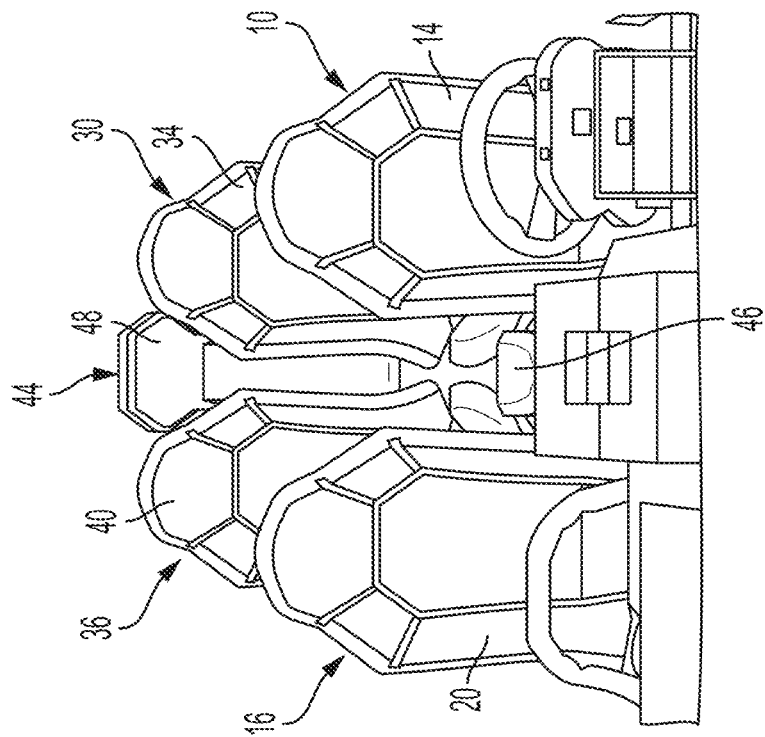
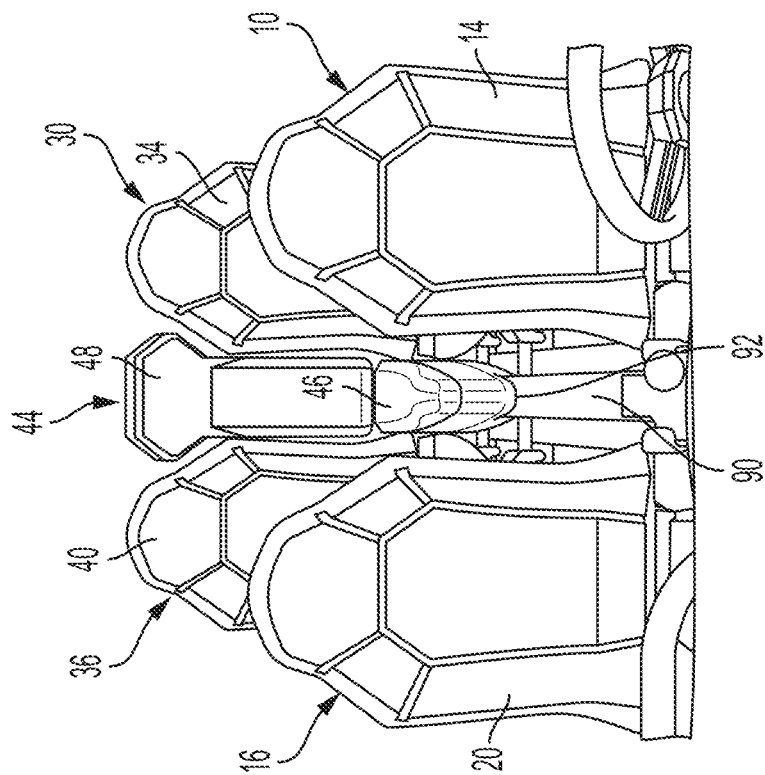

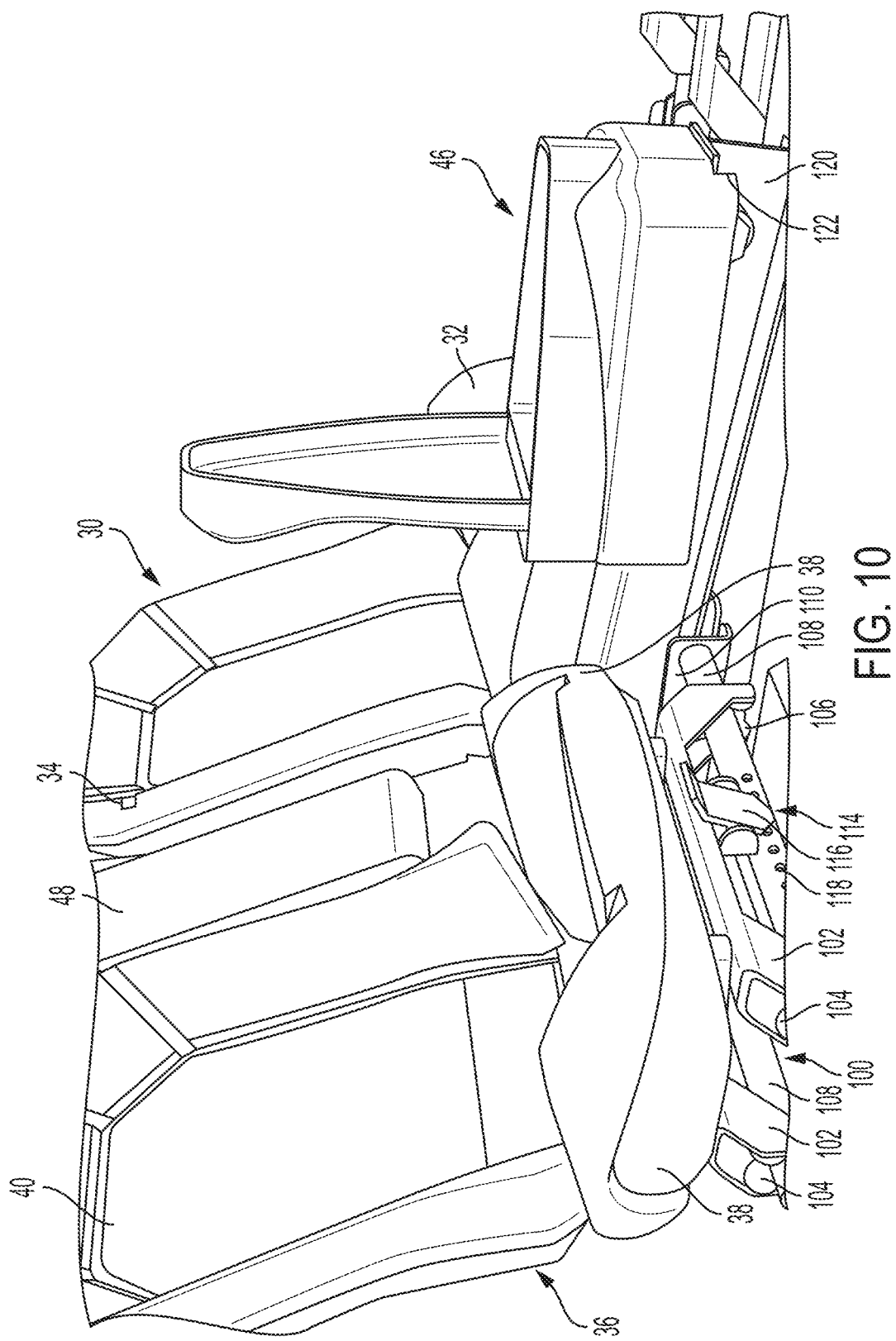

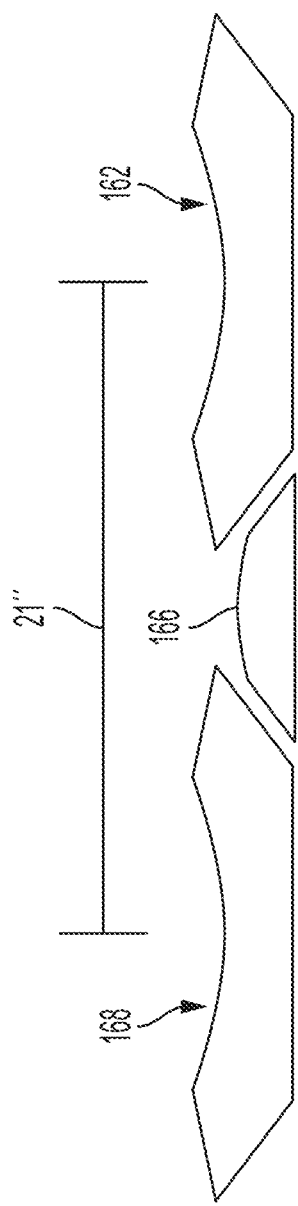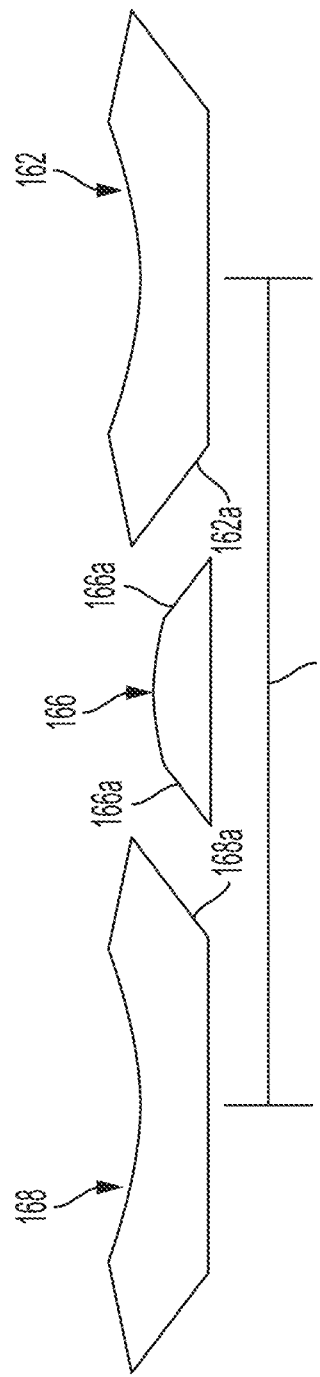

VEHICLE SEATING ARRANGEMENTS

RELATED APPLICATIONS

The present application is a divisional of U.S. patent application Ser. No. 16/242,626, filed Jan. 8, 2019, which claims priority to U.S. Provisional Patent Application No. 62/615,142 filed Jan. 9, 2018, the subject matter of which are incorporated herein by reference.

FIELD OF THE INVENTION

The present invention relates to side-by-side vehicles and all-terrain vehicles, and more particularly to seating arrangements for these vehicles.

BACKGROUND OF THE INVENTION

Generally, all-terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint. It is also common for the side-by-side vehicles to include front and back rows of seats to accommodate four riders, as shown for example in U.S. Pat. Nos. 8,328,235 and/or 9,393,894, the subject matter of which are incorporated herein by reference.

In one illustration of the invention, a vehicle comprises a frame, a plurality of seats, comprising at least two front seats, at least two rear seats, and a rear jump seat positioned intermediate the two rear seats; the jump seat comprising a seat back which is positioned rearwardly of the rear seats, and the rear seats being movable laterally between a first position where the rear seats are proximate to each other and generally covering the seat back of the jump seat, and a second position where the rear seats are spaced apart from each other and the seat back of the jump seat is exposed.

In another embodiment, a vehicle, comprises a frame; at least two front seats; at least two rear seats, each having a seat back and a seat bottom; and a rear jump seat positioned intermediate the two rear seats, the rear jump seat having a seat back and a seat bottom; the seat back of the jump seat being positioned intermediate the seat backs of the rear seats, and the seat bottom of the jump seat being raised relative to the seat bottoms of the rear seats and wherein the seat bottom of the jump seat includes a storage are therein.

In another embodiment, a vehicle comprises a frame, a plurality of seats, comprising at least two front seats and at least two rear seats, the rear seats being movable laterally between a first position where the rear seats are proximate to each other and a second position where the rear seats are spaced apart from each other.

In another embodiment, a vehicle comprises a frame having a front seating frame portion and a rear seating frame portion; a plurality of seats, comprising at least two front seats supported by the front seating frame portion and at least two rear seats supported by the rear seating frame portion; the rear seats comprising a seat bottom and a seat back, wherein the seat bottom is rotatable relative to the rear seating frame portion and the seat backs are movable relative to the frame.

In yet another embodiment, a vehicle seat comprises a seat bottom having a seat bottom base and a seat bottom cushion portion on which a rider would be seated; a seat back having a seat back base and a seat back cushion portion against which a rider's back would be placed when seated; the seat bottom base and the seat back base including air channels therethrough which communicate with openings on an outer surface of the seat bottom cushion portion and the seat back cushion portion; and an air supply for supplying ventilating air to the air channels.

BRIEF DESCRIPTION OF THE DRAWINGS

The invention will now be described with reference to the drawing figures where:

FIG. 8 shows a front perspective view of another embodiment of seating arrangement where the jumpseat is accessible;

FIG. 9 shows the seating arrangement of FIG. 8 where the jumpseat is not exposed;

FIG. 10 shows the jumpseat seat bottom movable along a track;

FIG. 13 is a diagrammatical sketch of the seat backs of the passenger seats and jumpseat where the jumpseat is not accessible;

FIG. 14 shows a diagrammatical sketch similar to that of FIG. 13 where the jumpseat seat back is accessible;

DETAILED DESCRIPTION OF THE DRAWINGS

Figure 1:
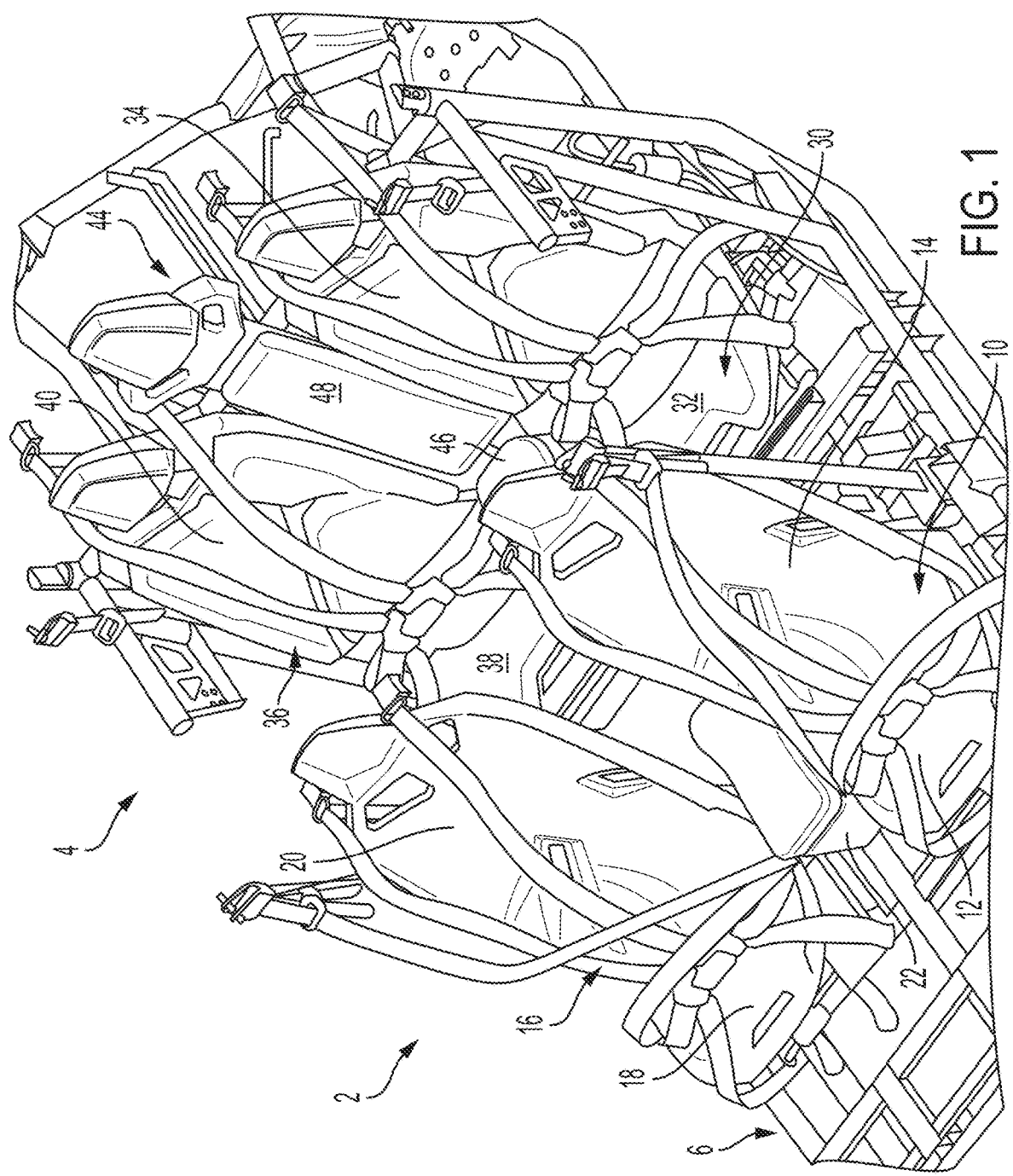
FIG. 1 is a front left perspective view of the seating arrangement of the present embodiment.
Figure 2:
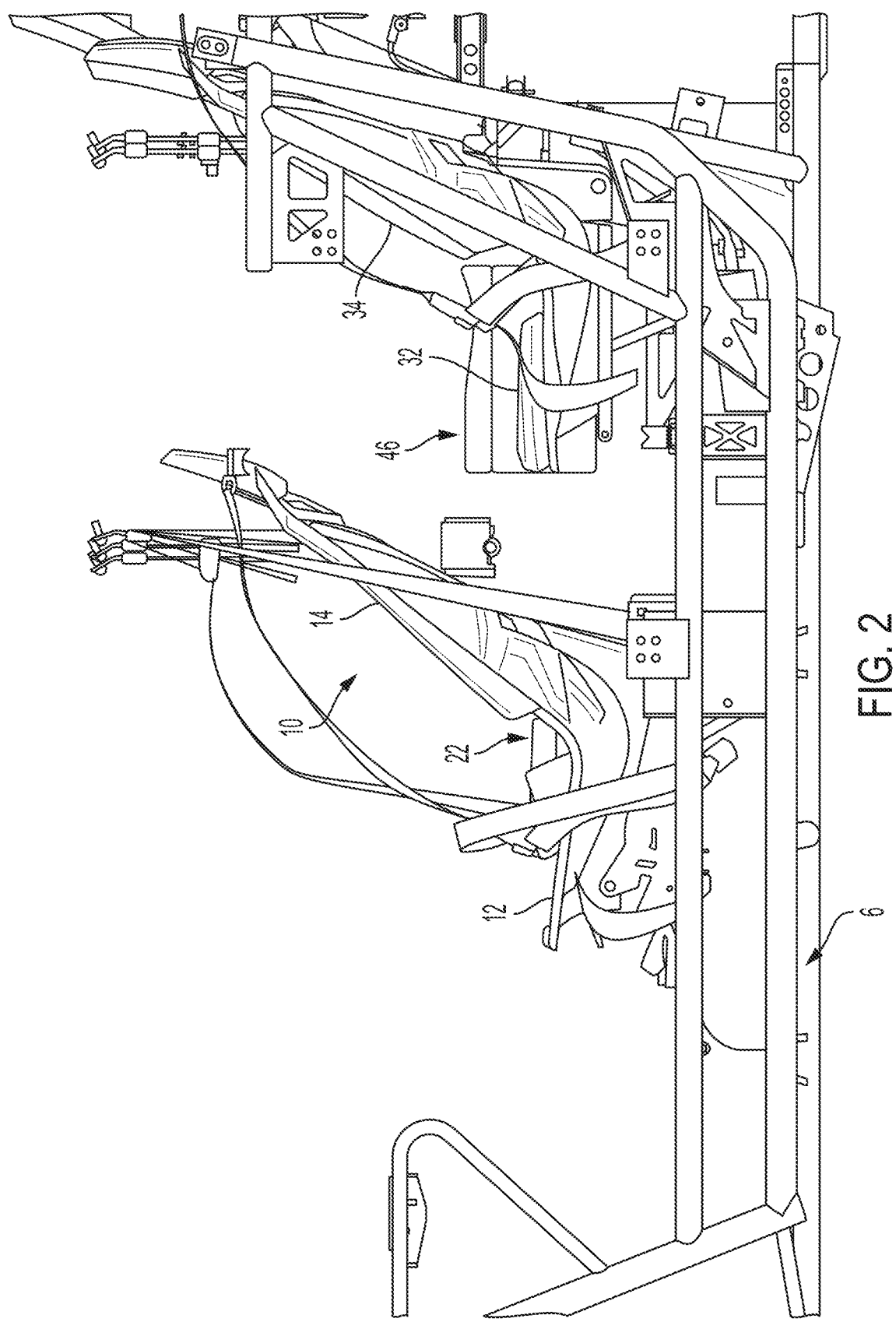
FIG. 2 is a left hand side view of the embodiment of FIG. 1.

With reference to FIGS. 1 and 2, a vehicle seating arrangement is shown where a front row 2 and a rear row 4 are coupled to a vehicle frame 6. The vehicle could be similar to U.S. Pat. No. 8,328,235 and/or and 9,393,894, the subject matter of which are incorporated herein by reference. Front row 2 includes driver seat 10 having a seat bottom 12 and a seat back 14. A front passenger seat is shown at 16 having a seat bottom 18 and a seat back 20. A console 22 may be positioned between seats 10, 16 for the convenience of the front passengers.

With reference still to FIGS. 1 and 2, rear row 4 includes a passenger seat 30 having a seat bottom 32 and a seat back 34. Rear right passenger seat is provided at 36 having a seat bottom 38 and a seat back 40. A jumpseat 44 is provided intermediate rear seats 30 and 36 and has a seat bottom 46 and a seat back 48. As provided herein, the jumpseat 44 is intended for selective accessibility for use such that seats 30 and 36 are movable to allow or disallow accessibility of the jumpseat 44. As shown in FIG. 1, jumpseat 44 is in a position showing accessibility of the jumpseat. It should also be noted that the jumpseat 44 is intended for a child such that the seat bottom 46 and seat back 48 are narrower than the remaining seat bottoms and seat backs. It is also shown best in FIG. 2 that the seat bottom 46 is shown elevated relative to seat bottom 32 to provide better visibility to the child using jumpseat 44.

Figure 3:
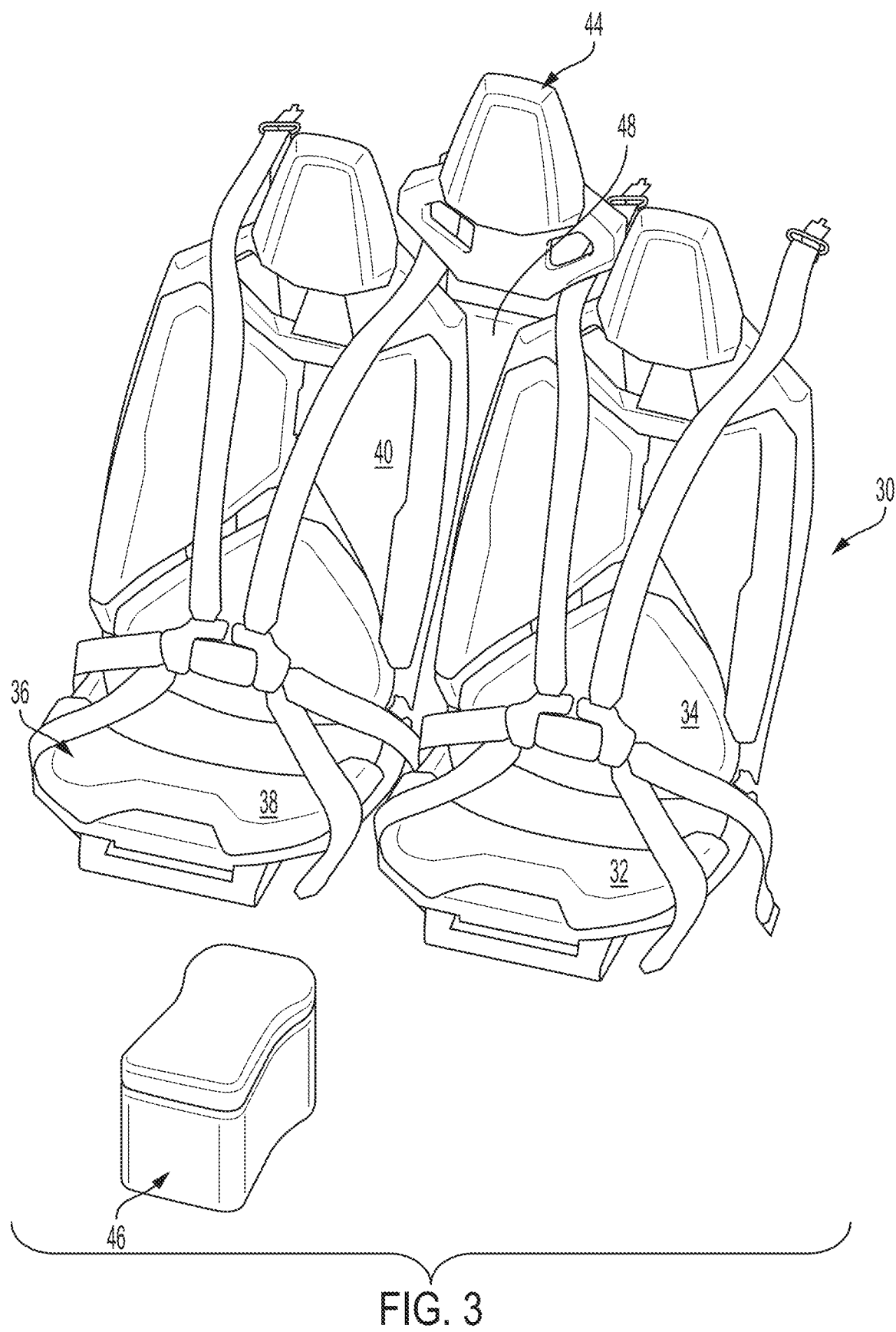
FIG. 3 is a front left perspective view of the rear seats.

With reference now to FIG. 3, the rear seats 30, 36 and the jumpseat 44 are shown in a position where the jumpseat 44 is not accessible. More particularly, the seats 30 and 36 are shown moved laterally towards each other in front of the seat back 48 and the seat bottom 46 is moved forwardly to allow the lateral movement of seats 30 and 36. The lateral movement of the seatbacks 34, 40 and the longitudinal movement of the seat bottom 46 will be described further herein.

Figure 4:
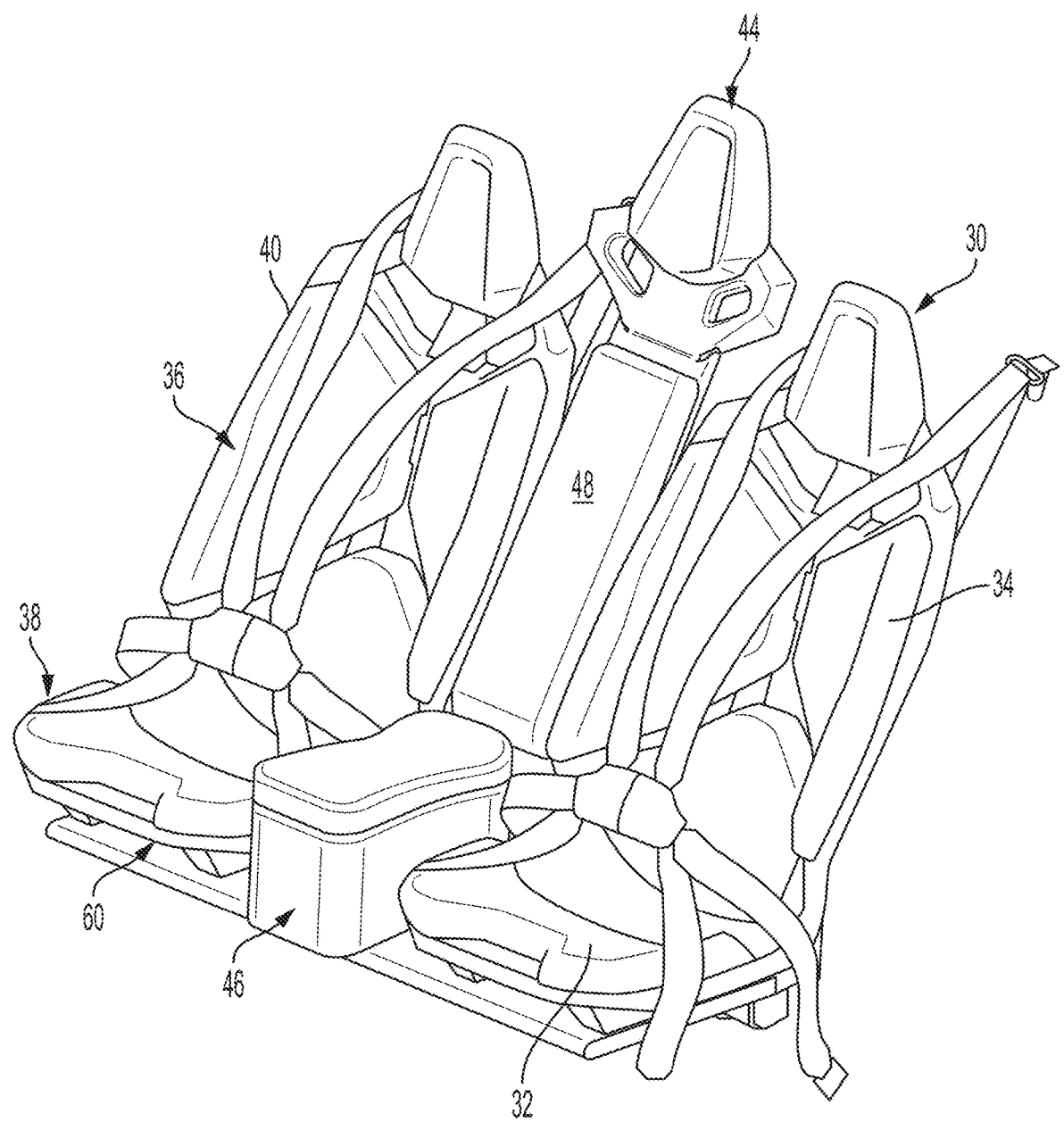
FIG. 4 shows another embodiment of the rear seats where the seat bottoms are rotatable.
Figure 5:
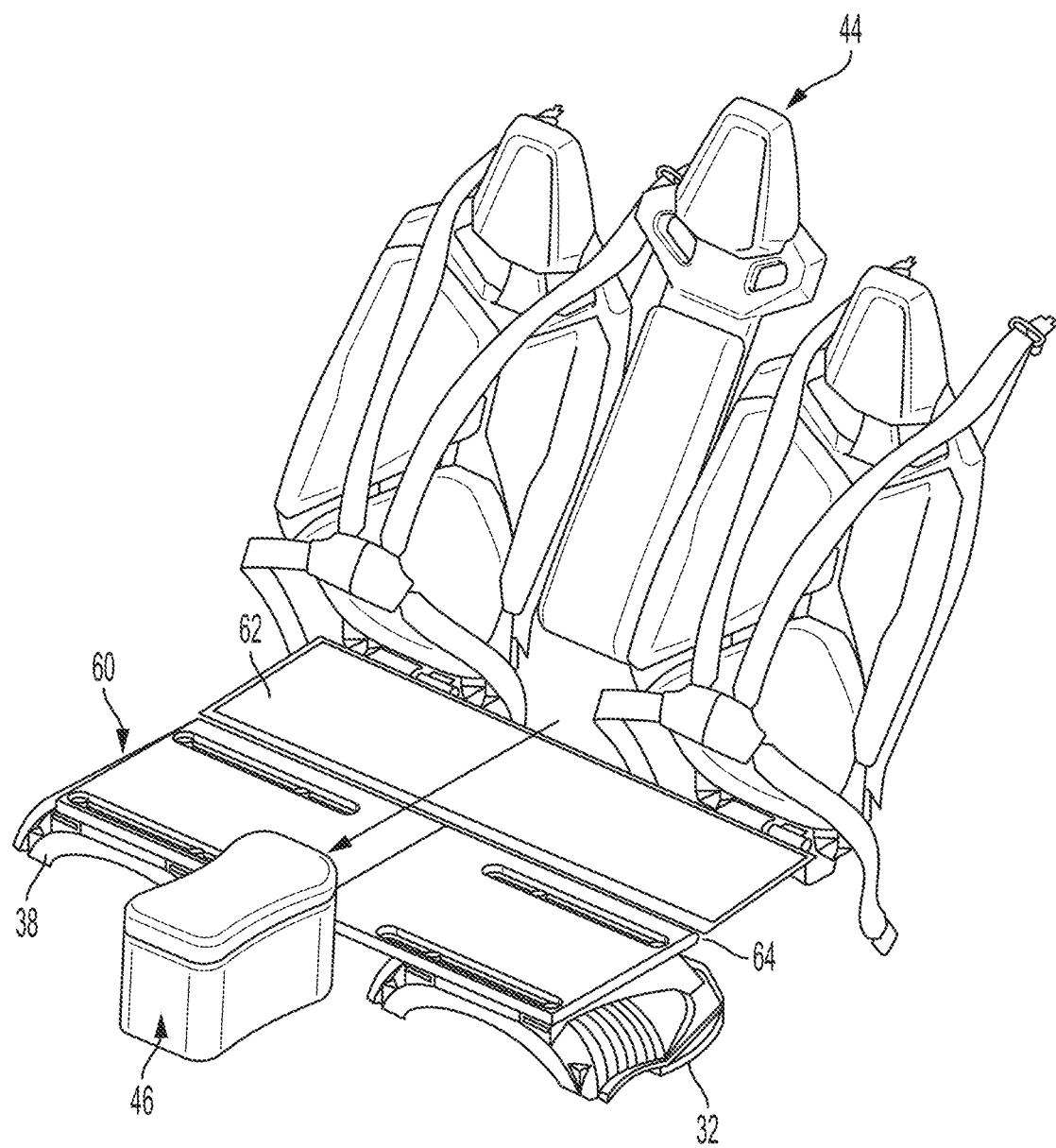
FIG. 5 is a view similar to that of FIG. 4 showing the seat bottoms rotated downwardly.
Figure 6:
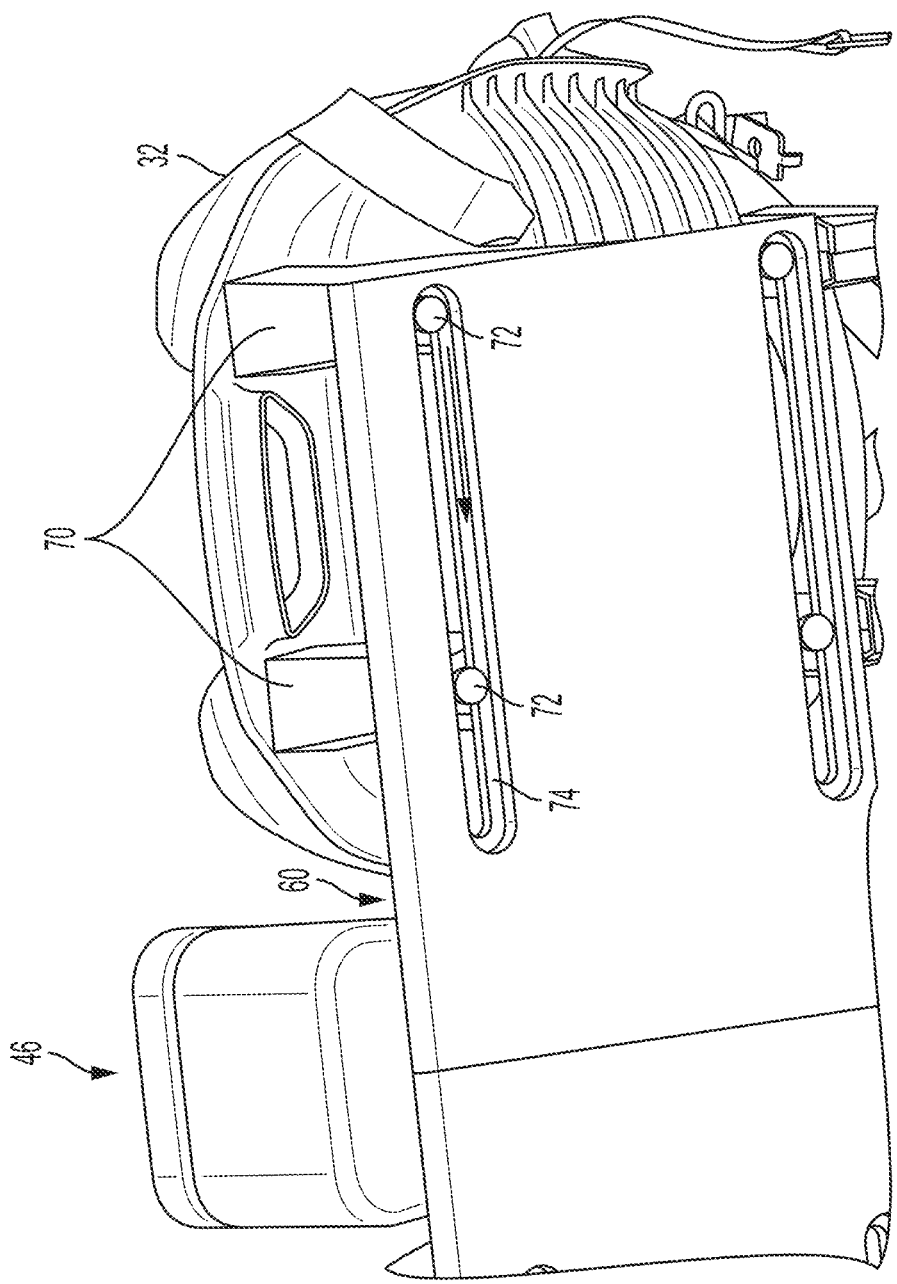
FIG. 6 shows an underside view of the panel to which the seat bottoms are coupled.

With reference now to FIGS. 4-6, the lateral movement of seats 30 and 36 will be described in greater detail. As shown in FIGS. 4 and 5, seats 30 and 36 are coupled directly to a movable panel 60 which is hinged to a base panel 62 about a rotatable edge 64 (FIG. 5). As shown best in FIG. 6, seat bottom 32 includes mounting arms 70 which couple to panel 60 by way of fasteners 72. Fasteners 72 are laterally movable in a groove 74, such that seats 30 and 36 may be moved towards and away from each other to accommodate the jumpseat 44. Fasteners 72 could be bolts, such as elevator bolts or bolts with a pan or truss head. Bolt 72 could actually tighten arms 70 to the panel 60 or simply allow enough clearance for the seat bottom 32 to laterally move within slot 74, whereas another adjustment mechanism could lock the seats in a lateral position. Alternatively, as opposed to having bolt 72, fasteners such as a T-slot nut or a knob fastener, such as a 3-wing knob or star-knob, could be used to loosen and tighten the seats and plates without tools. Regardless of the type of fastener at 72, when panel 60 is rotated to position the seat bottoms 32, 38 facing downwardly, panel 60 and 62 form a substantially planar storage area, as discussed further herein. Seat bottom 46 is shown having been moved forwardly in FIG. 5, to accommodate the movement of panel 60.

Figure 7:
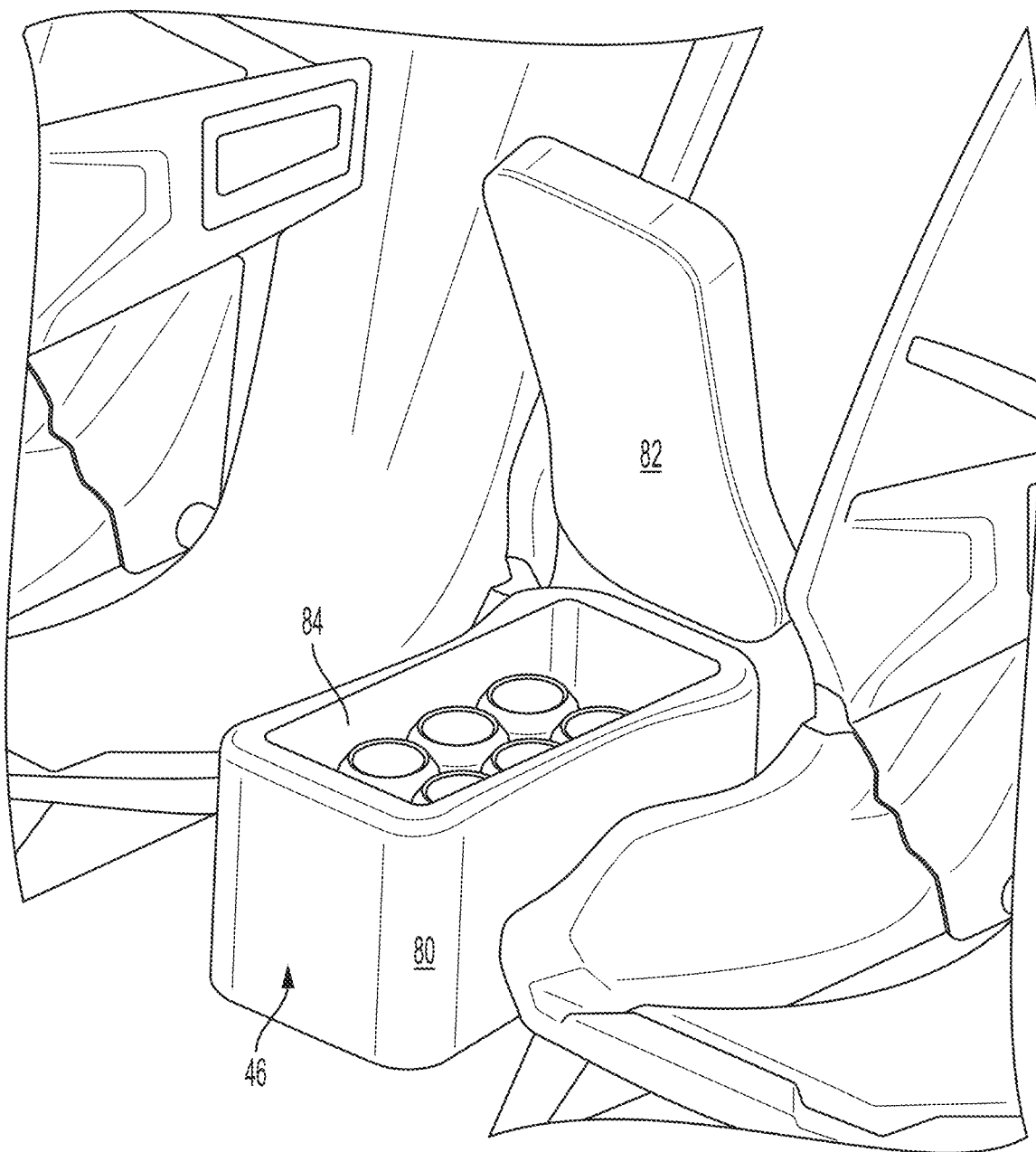
FIG. 7 shows the jumpseat seat bottom configured as a storage container.

As shown in FIG. 7, seat bottom 46 of jumpseat 44 could be a storage container having a lower portion 80 and a lid portion 82 which also forms the cushion portion of the seat bottom 46, and where lower portion 80 includes an inner volume at 84, such storage container could be a cooler.

With reference now to FIGS. 8 and 9, FIG. 8 shows the rear seats 30 and 36 spaced apart from each other exposing the jumpseat 44. As shown, the seat bottom 46 is coupled to an I-shaped track 90 and seat bottom 46 includes a notched area at 92 to receive the track 90, such that seat bottom 46 can move from the position shown in FIG. 8 forwardly to the position shown in FIG. 9. This movement allows seats 30 and 36 to move laterally towards each other to cover seat back 48 of jumpseat 44. It should also be appreciated that the rear passengers have the best viewpoint where the seats are positioned in the configuration of FIG. 9, as they can see forwardly through the spacing between the driver and front passenger. It should be understood that the track 90 could be any shape such as U-shaped, L-shaped, T-shaped, etc.

With reference now to FIG. 10, as opposed to the fasteners 72 shown in FIG. 6, rear seats 30 and 36 could include a lateral track system 100 comprising brackets 102 coupled to the bottom of seat bottom 38, where each of the brackets 102 includes upper and lower rollers 104 and 106 which traverse along tubes 108. In the present embodiment, the rollers have an hour-glass configuration but could be any shape which allows the movement. Tubes 108 are fixed relative to the frame by way of angled brackets 110. A latch mechanism 114 includes a lever arm 116 having a peg (not shown) which registers with one of a plurality of apertures at 118, such that rotation of lever 116 disengages the peg from aperture 118 whereby seats 32, 36 may move laterally, whereupon lever 116 can register with a new spaced-apart aperture 118. FIG. 10 also shows an I-shaped track 120 which is received in opening 122 of seat bottom 46, which allows the seat bottom 46 to move longitudinally forward, allowing spacing for the lateral movement of the seat bottoms 32, 38.

Figure 11:
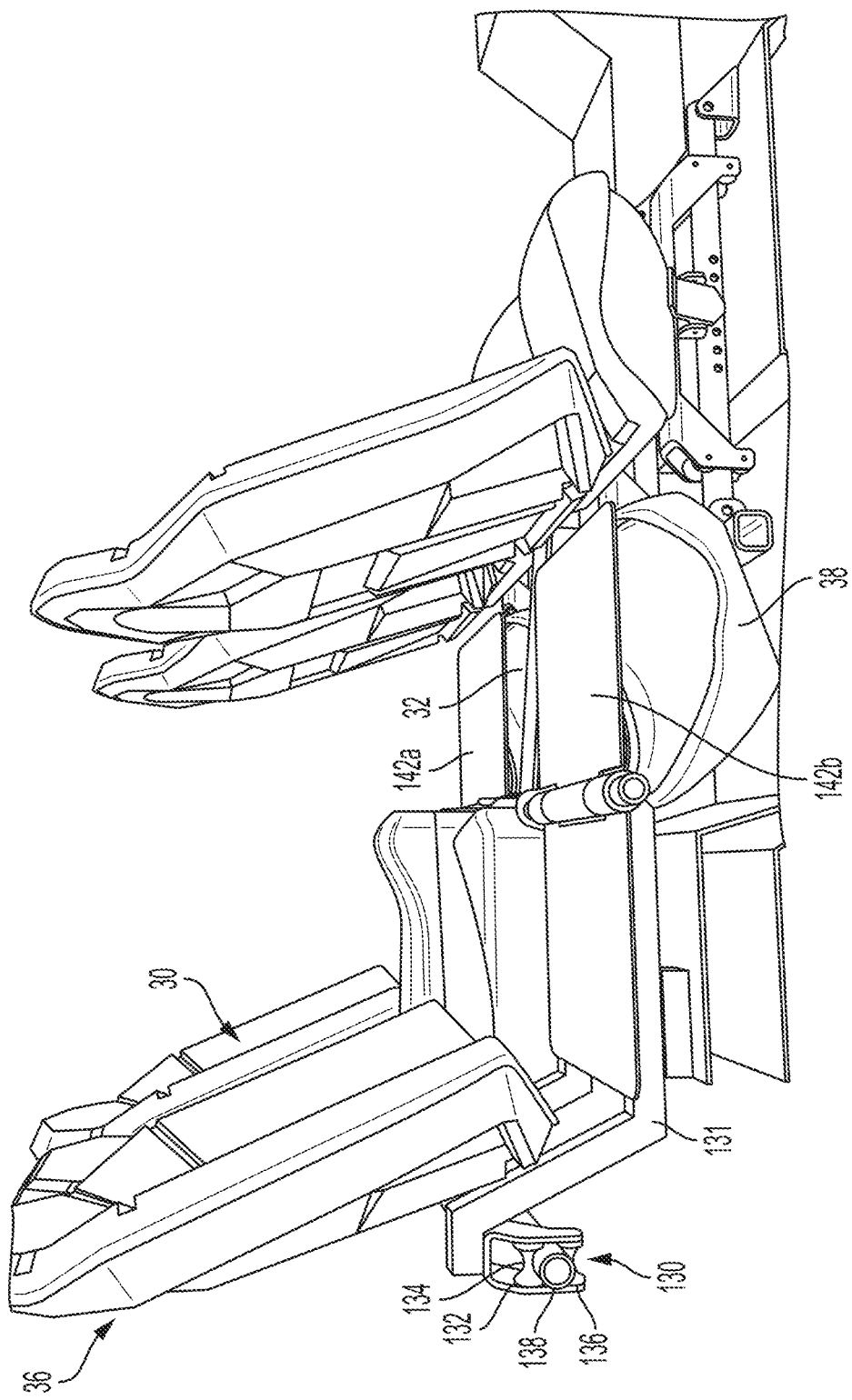
FIG. 11 shows another embodiment of rear seats where the seat bottoms are rotatable.
Figure 12:
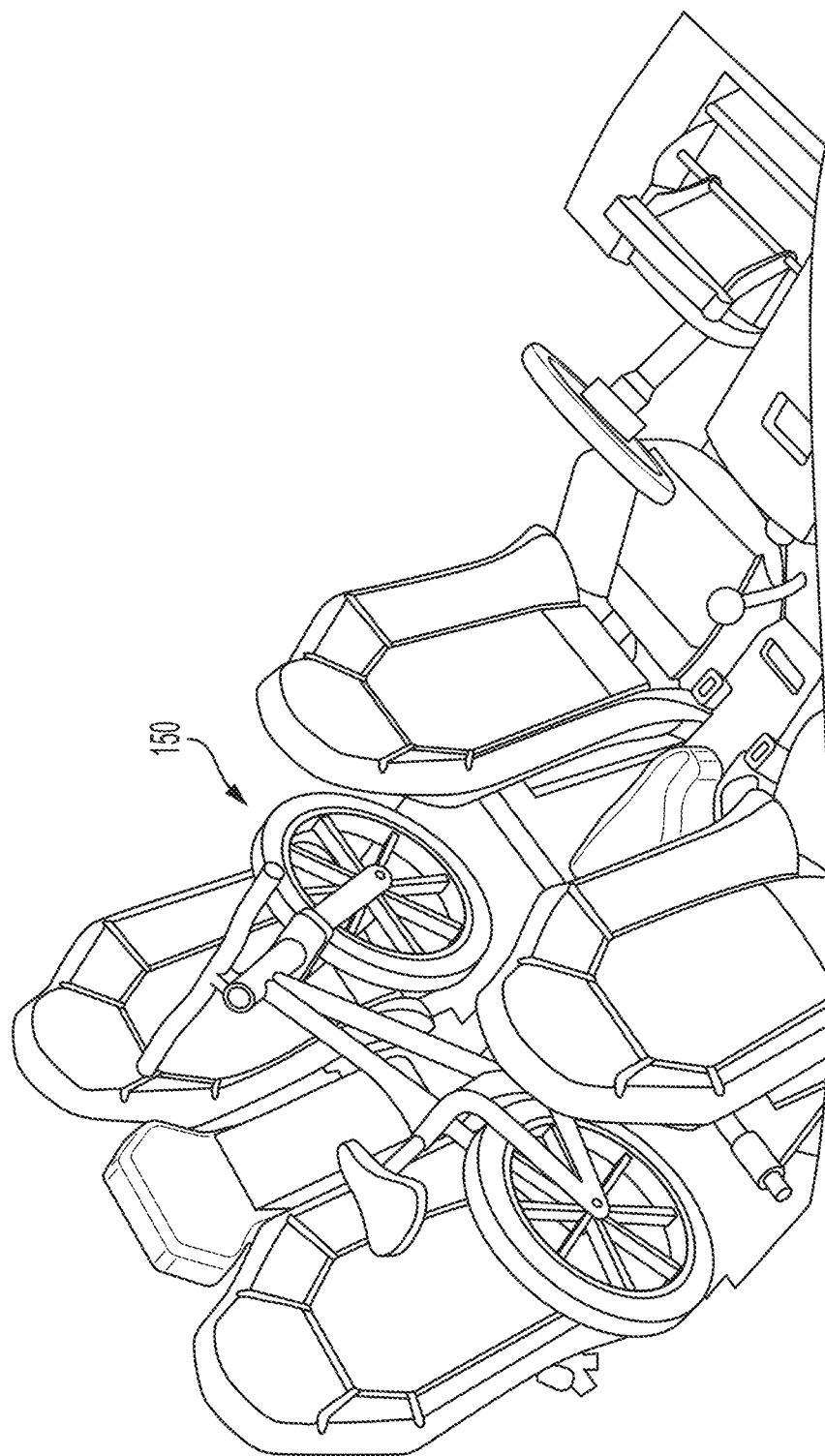
FIG. 12 shows the embodiment of FIG. 11 with the increased storage space provided when the seat bottoms are rotated downwardly.

With reference now to FIGS. 11 and 12, a further embodiment of the seating arrangement will be described. The embodiment of FIG. 11 is similar to that of FIG. 5, where a seat frame 131 is provided having a track mechanism at 130. Track mechanism 130 is similar to that of track mechanism 100 shown in FIG. 10, except track mechanism 130 is coupled at the backside of seats 30 and 36. Track mechanism 130 includes a bracket 132 coupled to seat frame 131 carrying upper and lower rollers 134, 136 which glide along tube 138. The embodiment of FIG. 11 also includes individual panel portions 142a and 142b, where each of the seat bottoms 32 and 38 are mounted to respective panel portions 142a and 142b. As shown in FIG. 12, extra storage space is provided when in the configuration of FIG. 11, such that cargo, such as a bicycle 150, could be stored and carried in the vehicle when the rear seats are not required.

With reference now to FIGS. 13 and 14, another seating arrangement is shown diagrammatically where in FIG. 13, seat backs 162 and 168 substantially cover seat back 166 of jumpseat 44, whereas in FIG. 14, seat backs 162 and 168 are moved laterally outwardly to expose seat back 166. As shown, each of the seat backs 162 and 168 moves laterally inwardly or outwardly a distance of 3.5" such that the center line spacing between the seat backs 162 and 168 varies from 21" to 28", such that each seat is movable by 3.5". It should also be understood that the seats may move a distance greater than 28", as the seat movement laterally outward is limited by the vehicle width. As shown in FIGS. 13 and 14, seat back 166 is substantially trapezoidal having side edges 166a, whereas seat back 162 and 168 have complementary surfaces 162a and 168a, which overlap seat bottom 166 in the position shown in FIG. 13.

Figure 16:
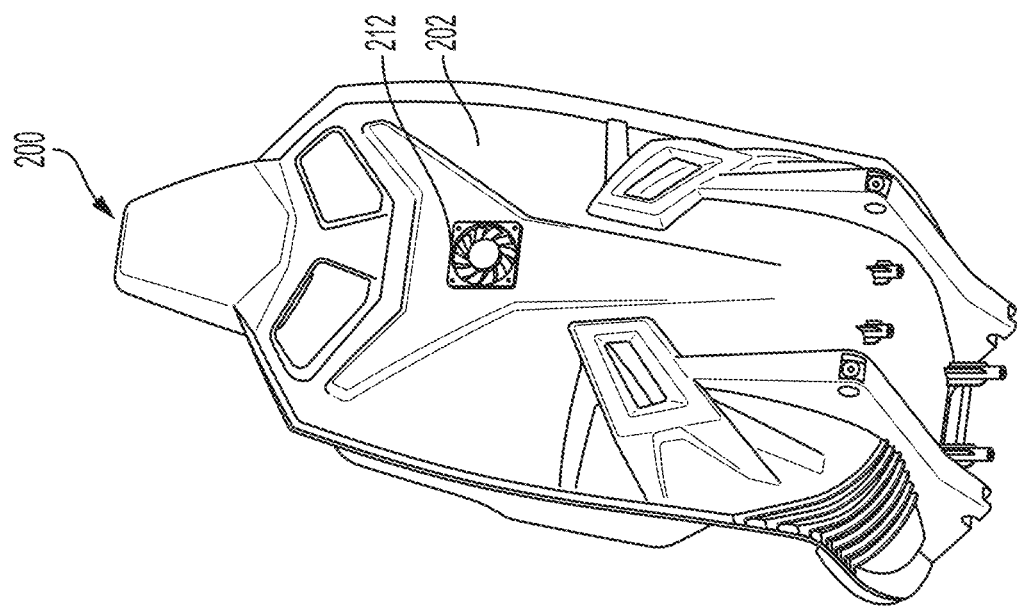
FIG. 16 shows a rear perspective view of the seat of FIG. 15 showing the fan.
Figure 15:
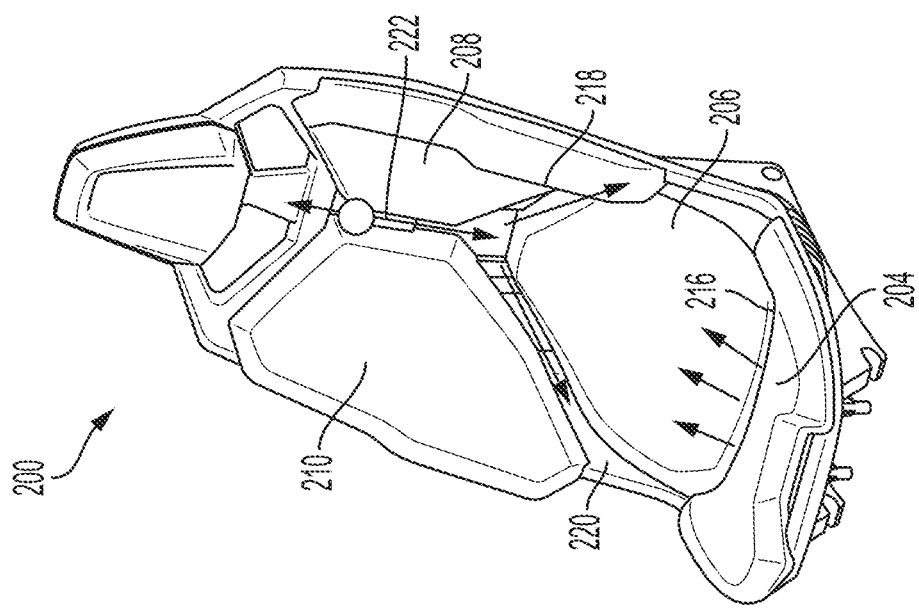
FIG. 15 shows a forced air cooling system for any of the passenger seats.

With reference to FIGS. 15 and 16, a ventilated seat is shown where the seat is an integrated seat having a shell portion 202, where the seat bottom is defined by a molded pad 204, and the seat back is defined by molded portions 206, 208 and 210. A fan 212 is position on a backside of shell portion 202 to force air through the shell to the front side of the seat. Passageways are defined between the pads 204-210, such that a passageway 216 is defined between pads 204 and 206, passageway 218 is defined between pads 206 and 208, passageway 220 is defined between pads 206 and 210 and passageway 222 is defined between pads 208 and 210. This forced air into passageways 216-222 cools the rider's body. It should also be appreciated that the air could be conditioned to include either heated air or cool air depending on the ambient temperature.

With reference now to FIGS. 17-27, another embodiment of rear seating assembly is shown at 250 generally comprised of seat frame 252, left side seat 254 having a seat bottom 256 and a seat back 258 and a right side passenger seat 260 having a seat bottom 262 and a seat back 264. A jump seat 270 is positioned intermediate seats 254 and 260 and includes a seat back 272 and a seat bottom 274. It should be appreciated that seat bottom 274 of jump seat 270 could be movable forwardly and rearwardly in any of the manners described above. Seats 254 and 260 are laterally movable to a position where seat bottom 274 of jump seat 270 may be positioned between seat bottoms 256, 262 to provide room for a third person on the jump seat 270 or seats 254 and 260 may be movable towards each other when the jump seat 270 is not necessary.

Figure 17:
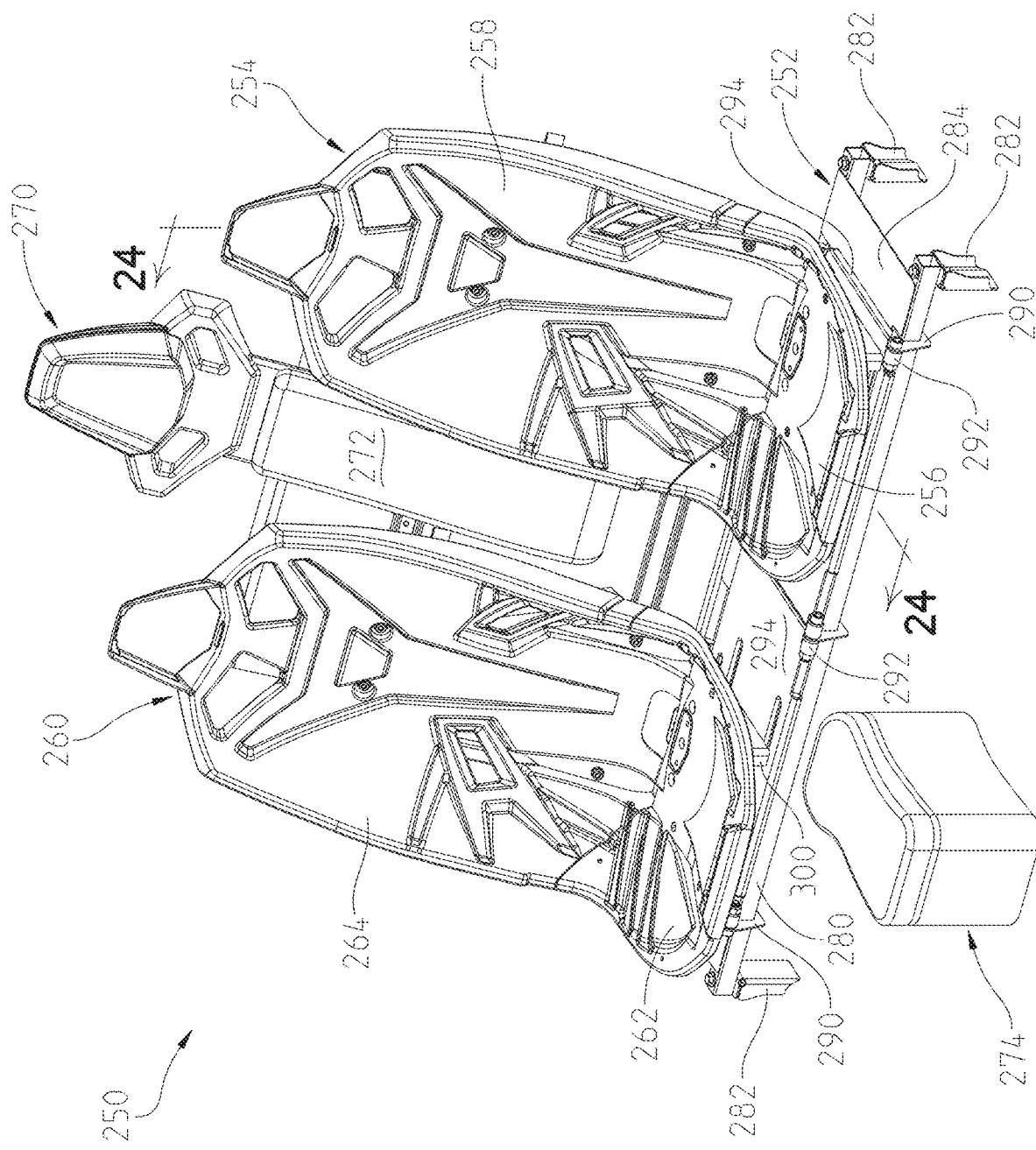
FIG. 17 is a front left perspective view of a further embodiment of rear seat and jump seat assembly.
Figure 18:
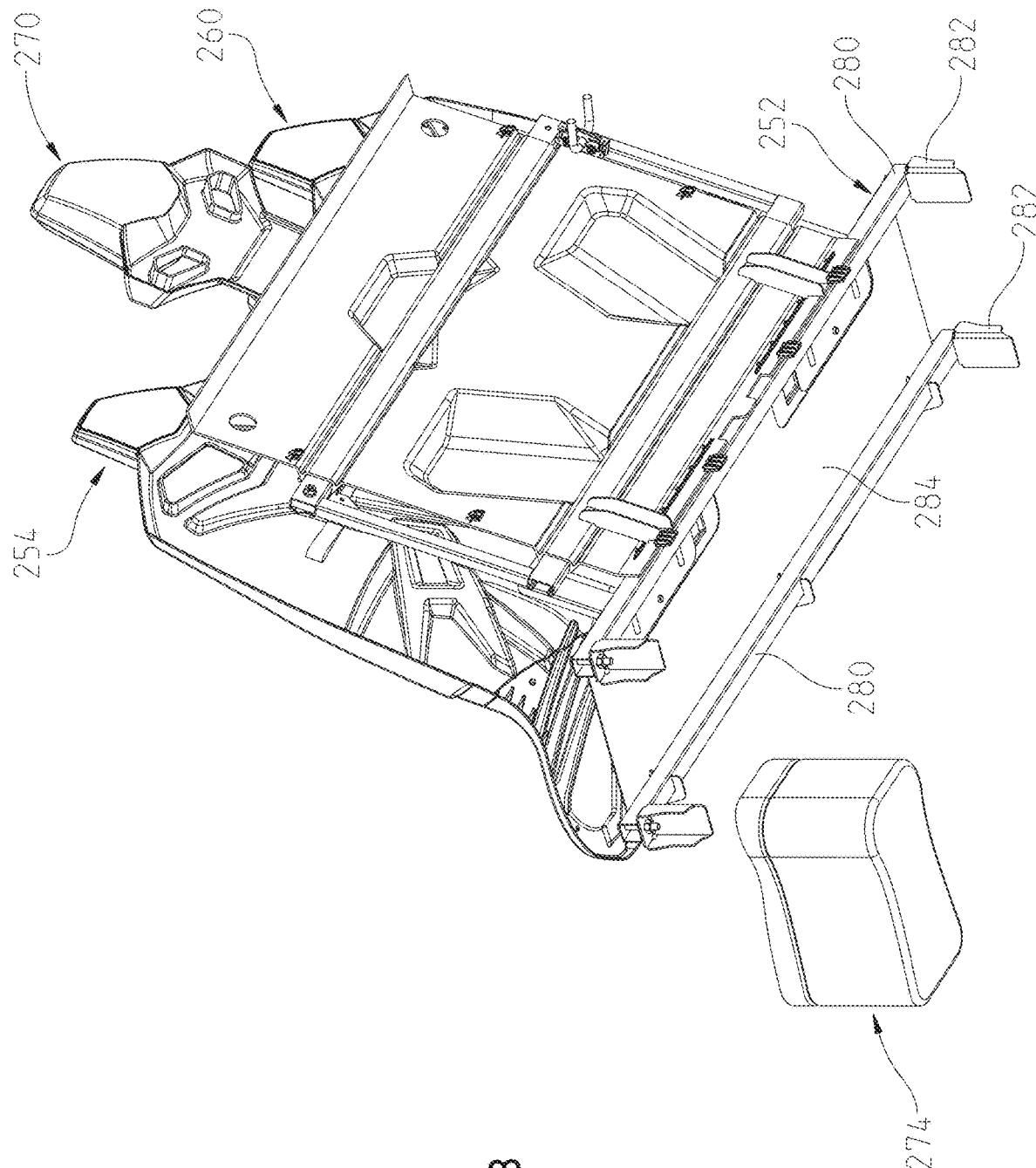
FIG. 18 is a rear left perspective view of the seat arrangement of FIG. 17.
Figure 19:
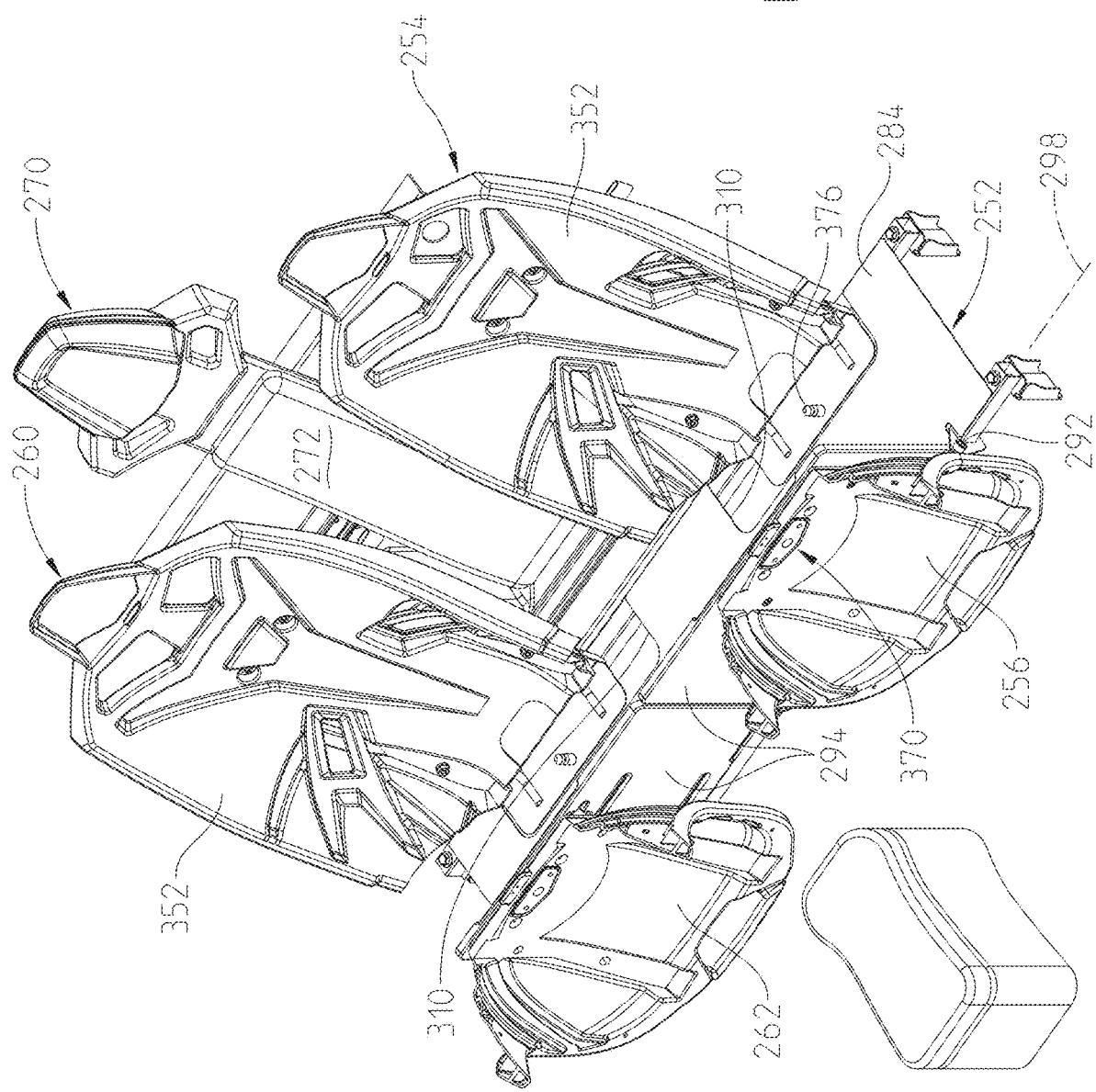
FIG. 19 shows a perspective view similar to that of FIG. 17 with the seat bottoms rotated forwardly.

With reference to FIGS. 17-19, seat frame 252 will be described in greater detail. Seat frame 252 includes two longitudinally extending rails 280 having brackets 282 for coupling to frame 6. Frame 252 further includes a plate 284 upon which seats 254 and 260 are supported. Seat frame 252 further includes front brackets 290 to which hinges 292 are attached which couple to seat supports 294. As shown best in FIG. 19, seat supports 294 may rotate forwardly about hinges 292 and can rotate to a position where seat supports 294 are substantially parallel, such as in the position of FIG. 5. As shown best in FIG. 19, seat bottoms 256 and 262 rotate by way of hinges 292 about a center of rotation 298.

Figure 20:
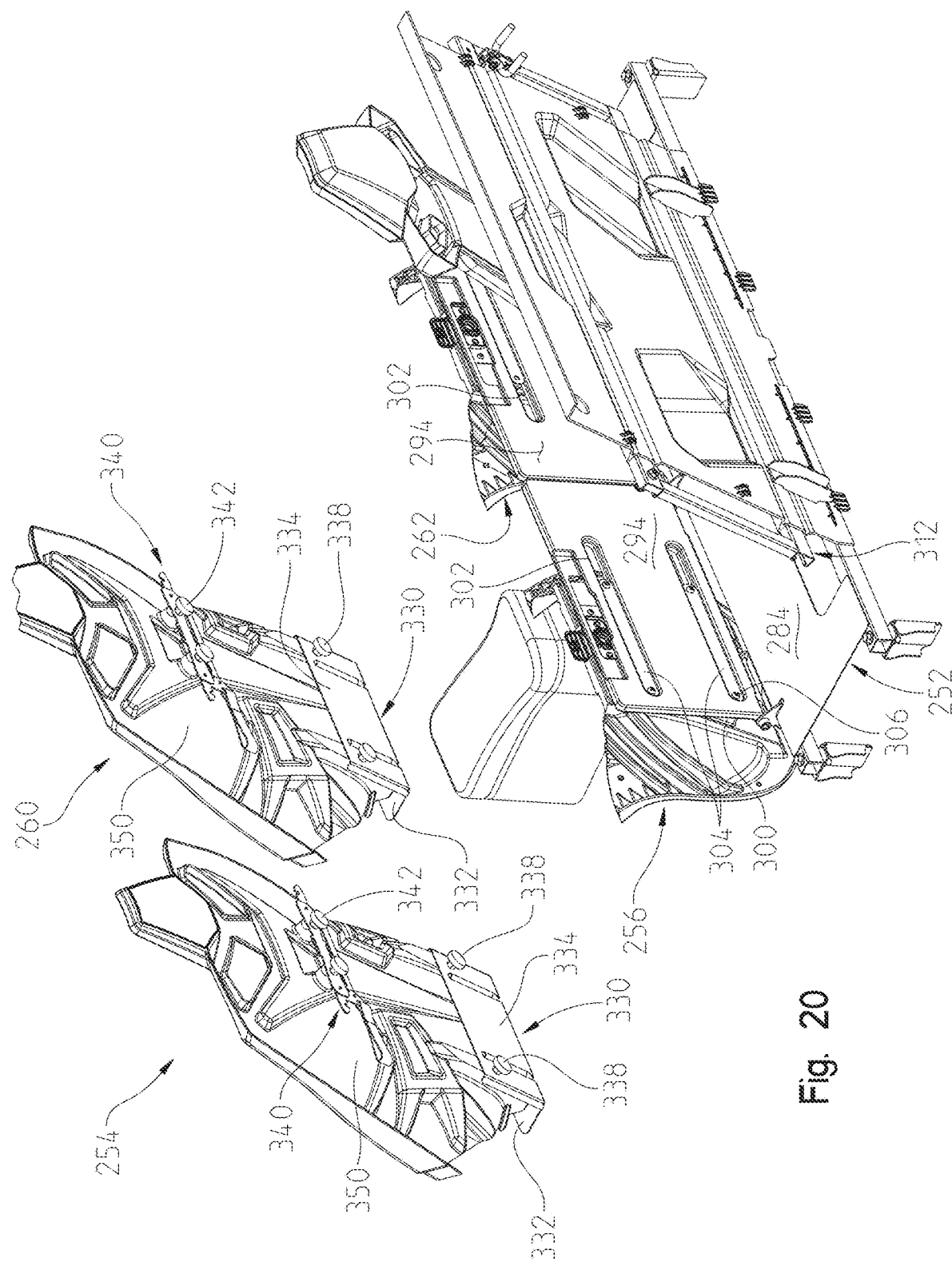
FIG. 20 is a rear left perspective view of the seating assembly of FIG. 17 with the seat bottoms rotated forward and the seat backs removed from the rear seat frame.
Figure 21:
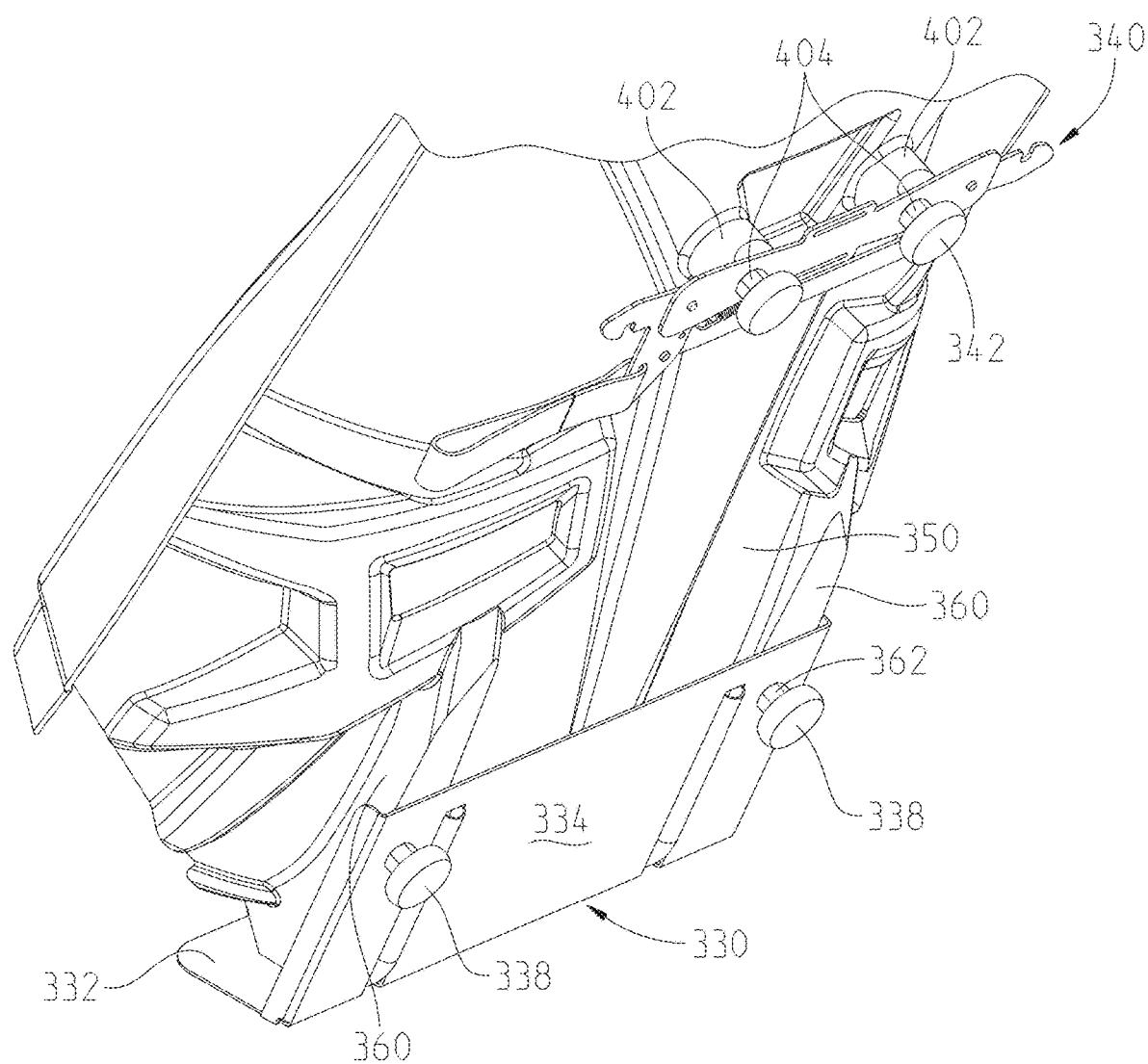
FIG. 21 is an enlarged view of the seat back assembly.

With reference now to FIGS. 17 and 20, seat bottom 256 and 262 include a seat base 300 which is coupled to seat supports 294. As shown best in FIG. 20, seat support 294 includes an open slot 302 which receives a sliding track 304 coupled to the bottom of seat base 300. Fasteners 306 couple sliding tracks 304 to the seat base 300 which allows the tracks 304 to slide laterally within the slots 302.

Figure 22:
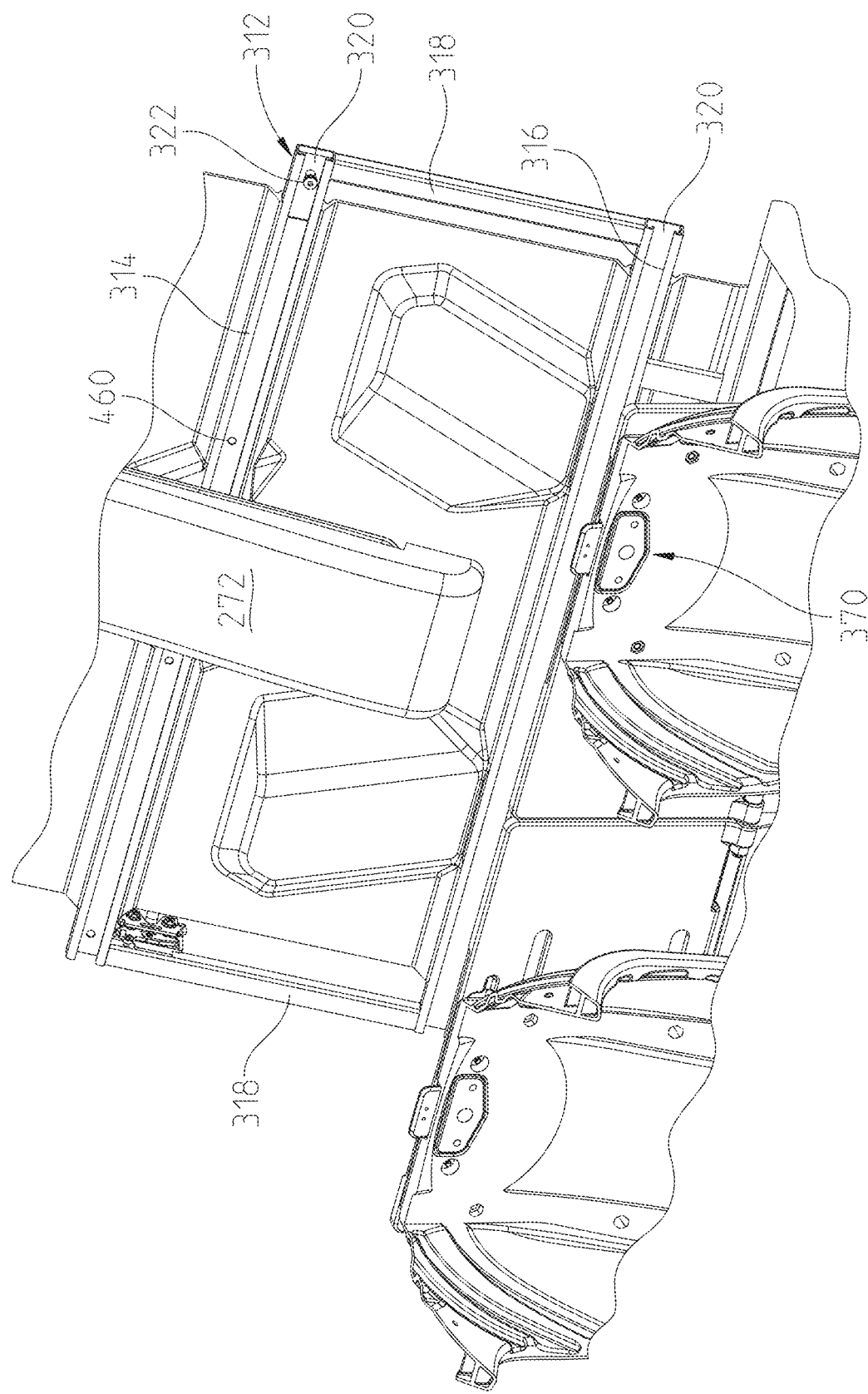
FIG. 22 is a front left perspective view of the seating assembly of FIG. 17 with the seat bottoms rotated forwardly and the seat backs removed.

With reference now to FIGS. 19, 20 and 22, seat frame 252 will be further described. As shown best in FIG. 19, plate 284 includes cutouts at 310 to accommodate the lateral movement of seat backs 254, 260, as further described herein. As shown best in FIGS. 21 and 22, frame 252 further includes a seat back frame member at 312 comprised of an upper channel 314, lower channel 316 and upright supports 318. Channels 314 and 316 define a channel opening at 320 where at least the top channel 314 includes a shoulder bolt 322.

With reference again to FIG. 20, seat back assemblies 254 and 260 include seat back supports 330 having a lower portion at 332 and an upper extending portion 334. Seat back supports 330 further include circular sliders 338, as described herein. Seat backs 254 and 260 further include latch assemblies 340 which also include circular sliders 342. It should be appreciated that circular sliders 338 may be positioned within channel 316 (FIG. 22), whereas sliders 342 are positioned in channel 314 (FIG. 22), with bottom portion 332 of seat support 330 positioned in cutouts 310 (FIG. 19). This allows seat backs 254 and 260 to move laterally with sliders 338, 342 moving in respective channels 316, 314.

It should be appreciated that the seat backs 254, 260 include a rear seat body portion 350 comprised of a strong composite material, such as a molded plastic material, whereas the front side 352 includes a cushion for the comfort of the rider. Thus, seat support 330 could be fastened directly to the seat body 350, for example where sliders 338 include a threaded shank which is received within a threaded aperture of the body 350. This would retain both the circular sliders 338 and the lower seat support 330 to the seat body 350. This is shown best in FIG. 21, where seat body 350 includes integrated rib portions 360, whereas sliders 338 include a hexagonal shank portion 362 which may be tightened by way of a wrench. A threaded shank (not shown) extends forwardly from the hex shank 362 and threads into a treaded insert of the rib portions 360.

Figure 23:
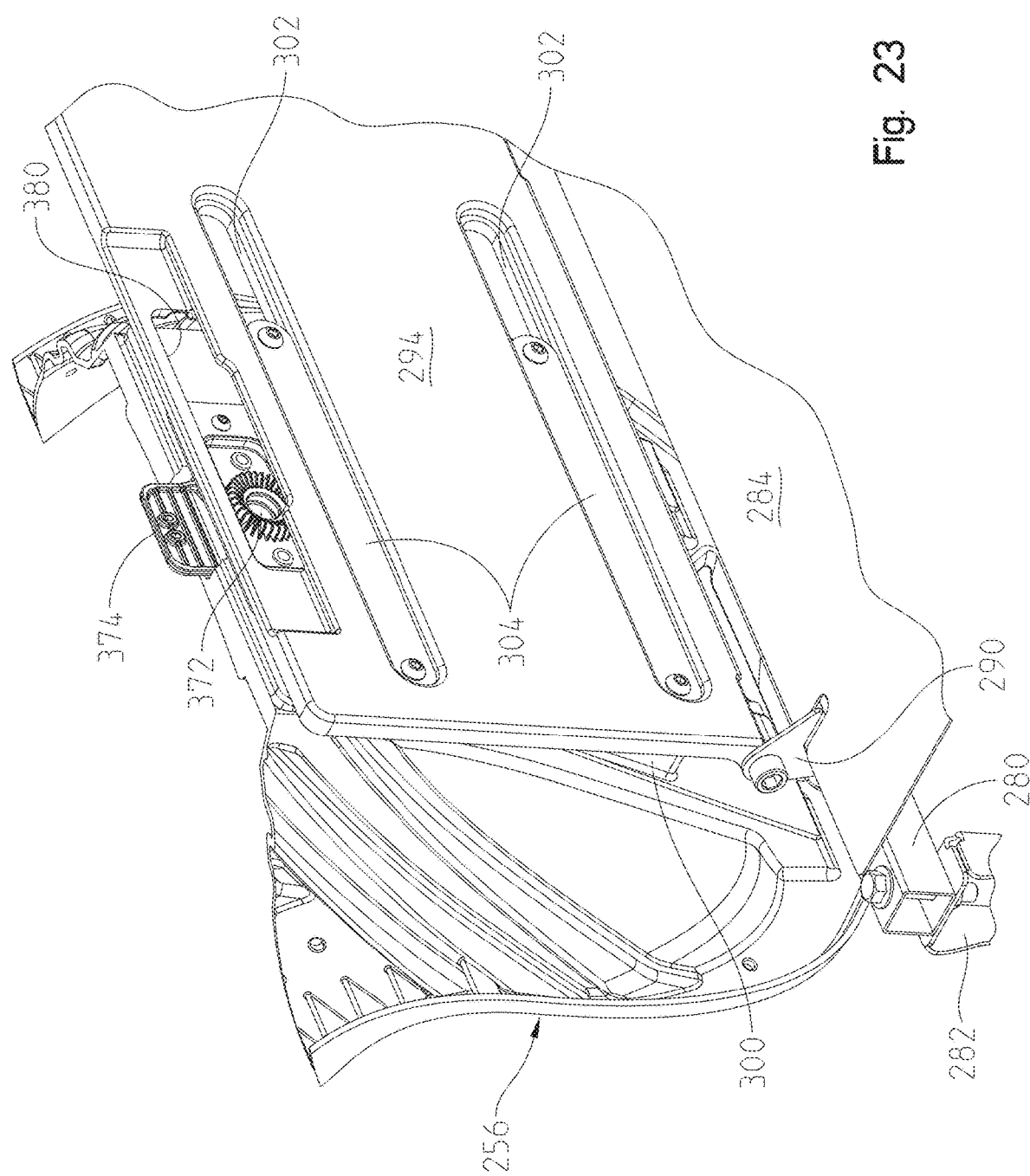
FIG. 23 is an enlarged perspective view of a portion of the seating assembly shown in FIG. 20.
Figure 24:
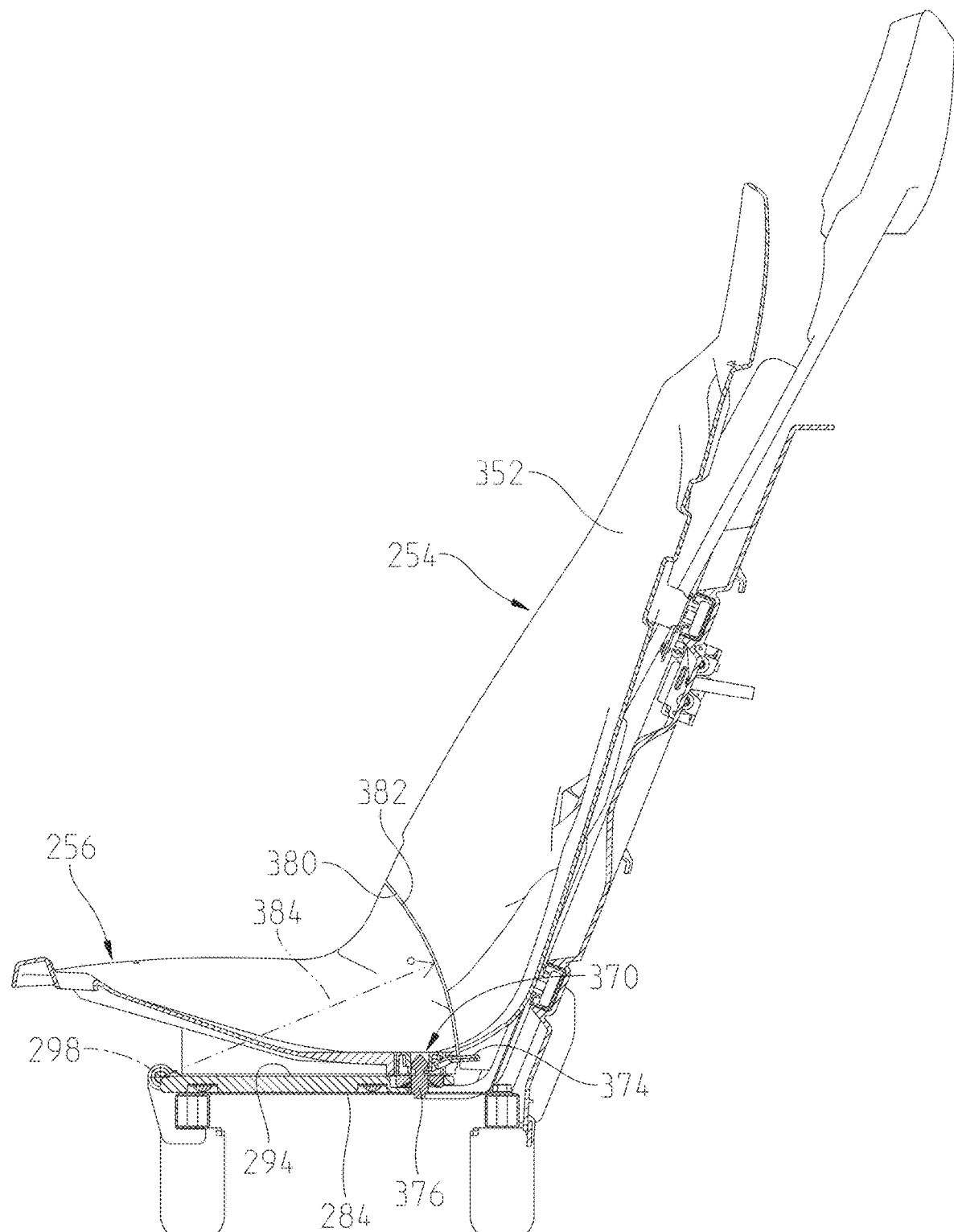
FIG. 24 is a cross sectional view through lines 24-24 of FIG. 17.
Figure 25:
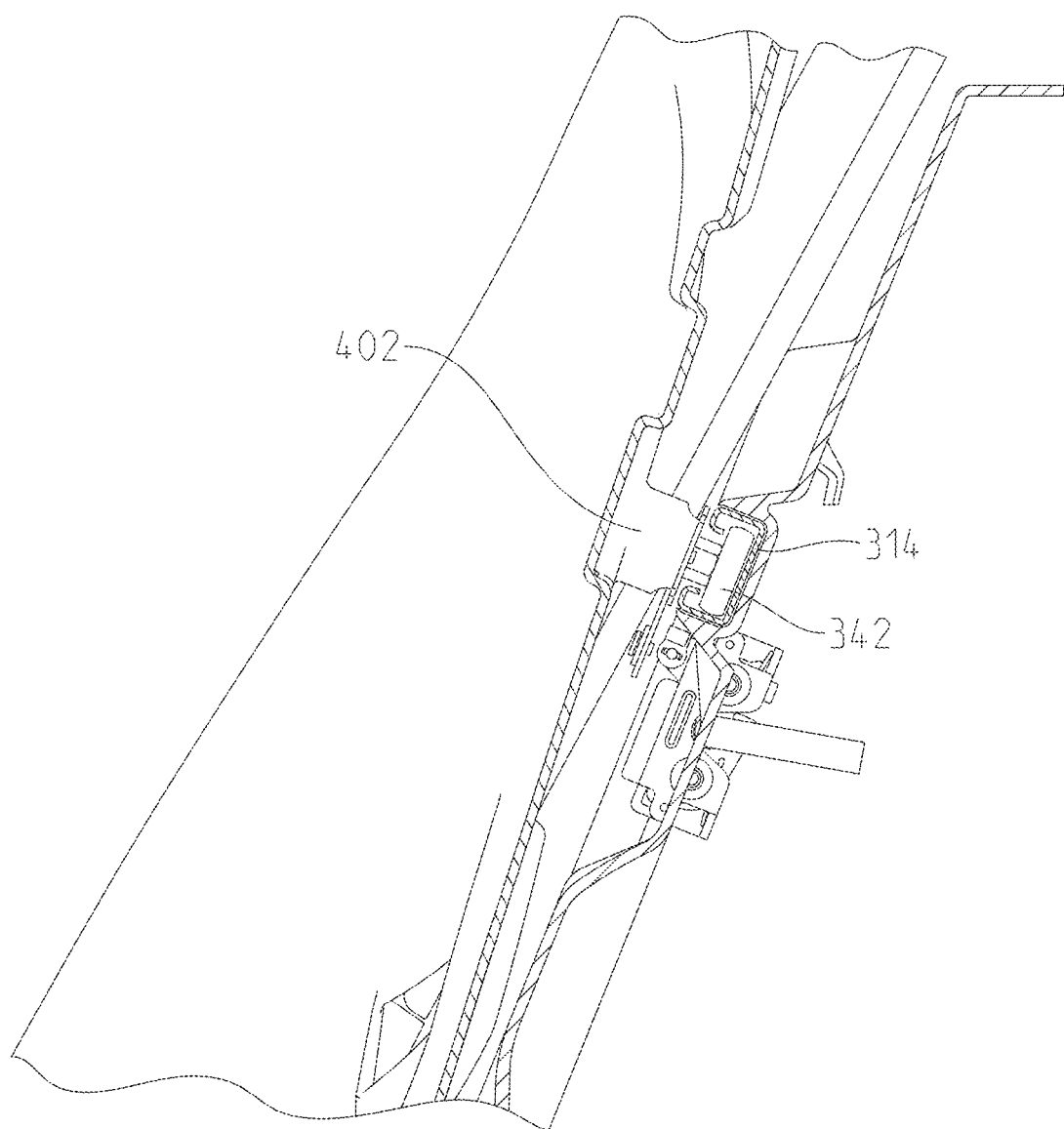
FIG. 25 is an enlarged view of the cross section of FIG. 24.
Figure 26:
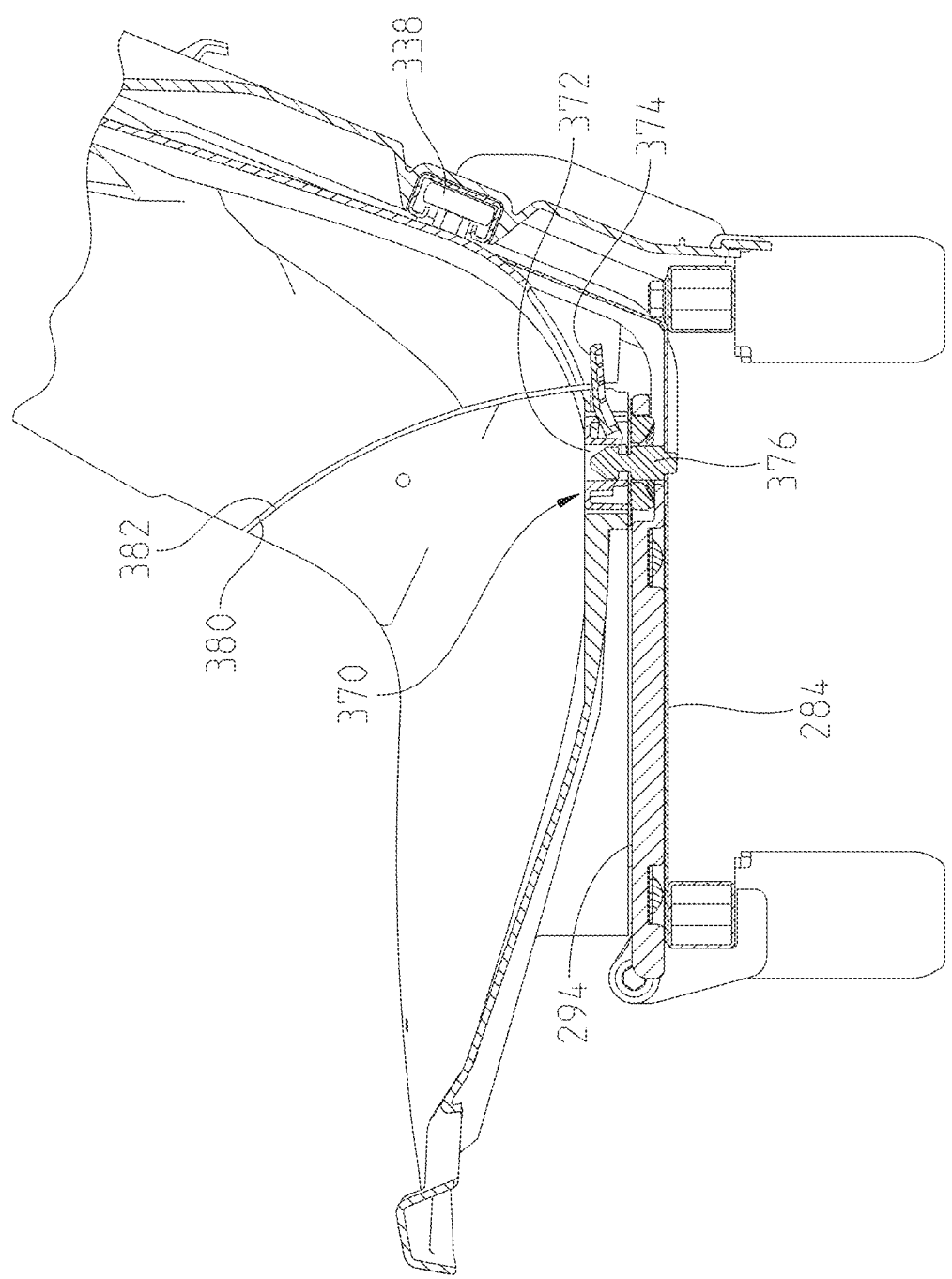
FIG. 26 is an enlarged portion of the cross sectional view of FIG. 24.

With reference now to FIGS. 19 and 23, a latch assembly will be described which latches the seat bottoms 256, 262 to the seat backs 254, 260. As shown, seat bottoms 256 include a latch receiver 370 which has a receiving opening 372 (FIG. 23) and a release lever 374 where receiver 372 can couple and decouple with latching peg 376 (FIG. 19). It should be appreciated that seat support 294 includes an opening 380 therethrough (FIG. 23), through which latching peg 376 can be received. Thus, seat bottom 256 and seat back 254 are independently laterally movable when decoupled from each other, (as in the view shown in FIG. 19), but when latched together, slide together when in a locked condition (as in the view shown in FIG. 17). It should be appreciated that latch 370 and peg 376 are substantially similar to that described in U.S. Pat. No. 8,678,464, the subject matter of which is incorporated herein in its entirety.

It should also be appreciated that the seat bottom 256 and seat back 254 are cooperatively designed for rotation relative to each other. As shown best in FIG. 24, the seat back includes an arcuate lower edge at 380, whereas the seat bottom includes an upper arcuate edge at 382. The edges 380, 382 are generally defined along a radius 384 relative to the rotation axis 298. Thus, seat bottom 256 may rotate relative to the seat back 254 as the surfaces 380, 382 are along the radius of rotation.

Figure 27:
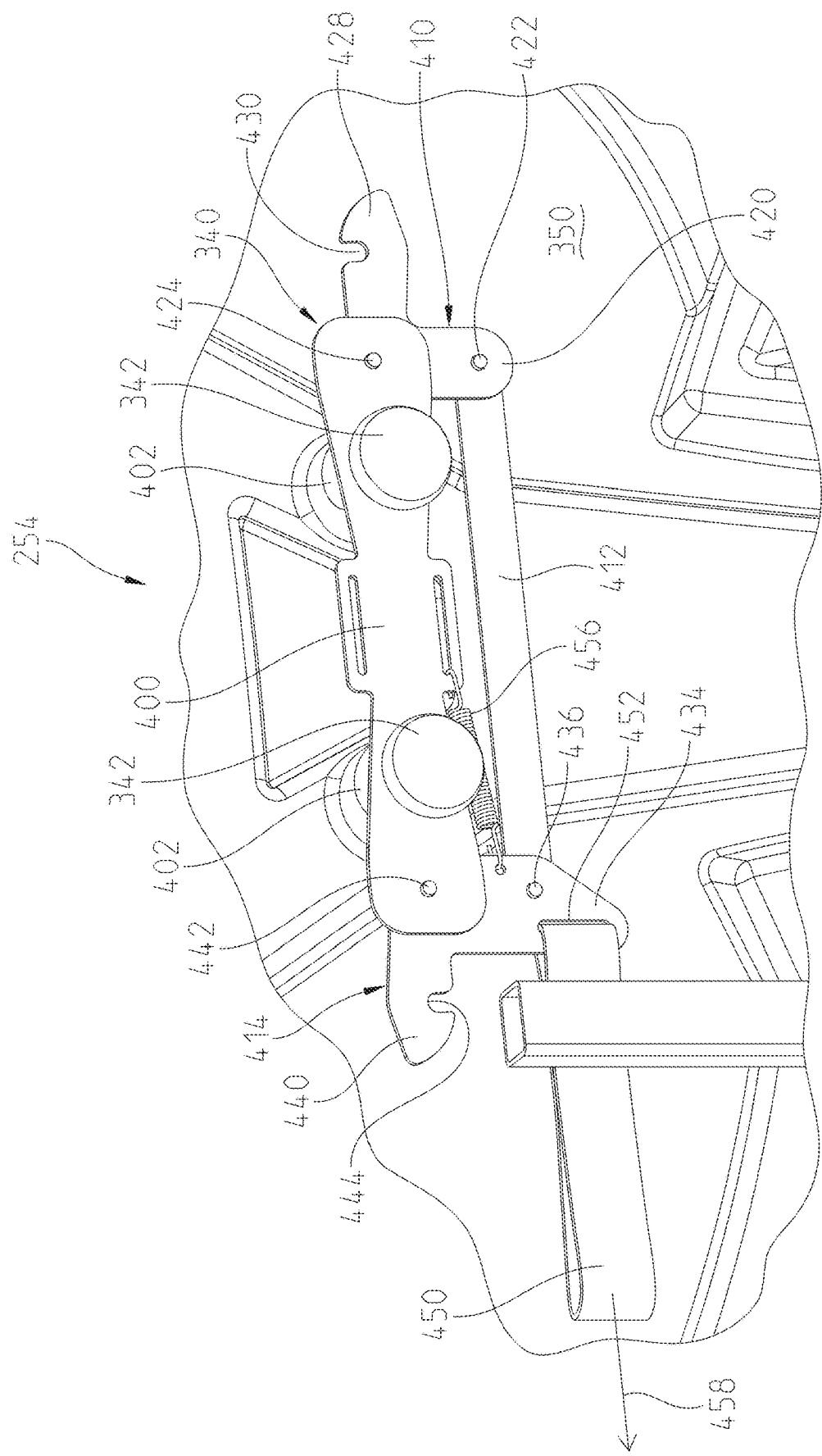
FIG. 27 is an enlarged rear perspective view of the latching assembly attached to the seat back.

With reference now to FIG. 27, the latch 340 will be further described. As shown, latch 340 defines a four bar linkage comprised of a fixed linkage 400 which couples to bosses 402 defined in the seat back 350. Circular sliders 342 are similar to sliders 338 including a hex shank 404 (FIG. 21) which couples upper linkage 400 to the bosses 402. Thus, linkage 400 is fixed relative to seat back 254. Latch 340 further includes a right hand L-shaped element 410, a drag link at 412 and a left hand L-shaped link 414. L-shaped member 410 includes a lower leg 420 coupled to link 412 at coupling 422 and is coupled to upper linkage 400 at coupling point 424. L-shaped member 410 further includes a leg 428 extending rightwardly with an upwardly opening slot at 430.

Left hand leg 414 includes a lower leg 434 coupled to drag link 412 at a coupling point 436. L-shaped link 414 includes a leftwardly extending leg at 440 coupled to upper linkage 400 at a coupling point 442. Leg 440 extends leftwardly with a downwardly opening slot at 430. A lanyard 450 is coupled to the lower leg 434 at a slot 452 and leg 434 is spring loaded to linkage 400 by way of a tension spring 456. Thus, when the lanyard is moved in the direction of arrow 458, both links 410 and 414 move in a clockwise direction and link 412 moves towards the left, as viewed in FIG. 27. Thus, when sliders 342 are positioned in channel 314 a left most position of seat back 254 would coincide with latch opening 434 coupling with stud 322 (FIG. 22). It should be appreciated that another stud 322 would be located at position 460 such that the right most position of seat back 254 wouldn't coincide with latch opening 430 coupling with the stud 322 at position 460.

Figure 28:
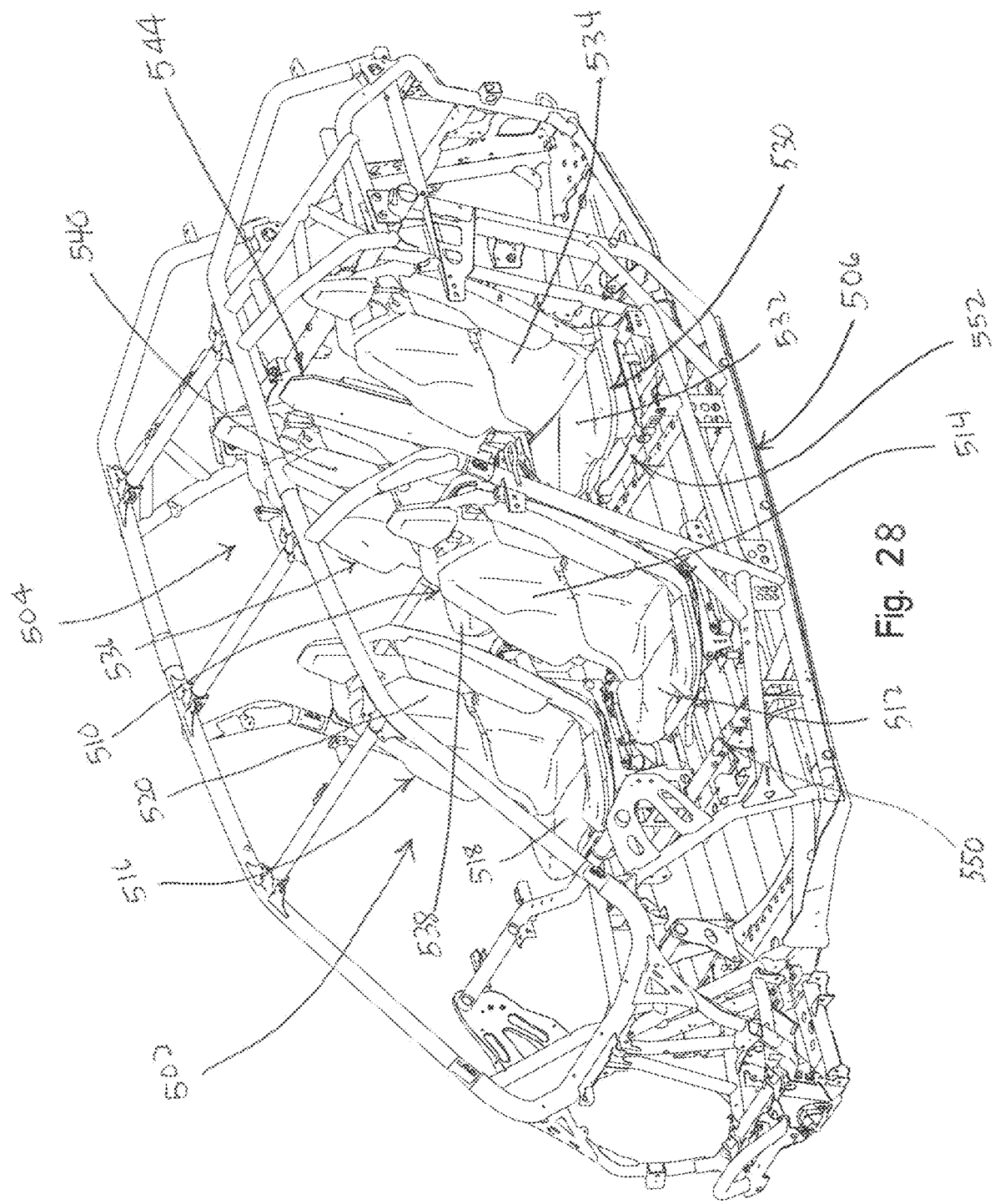
FIG. 28 shows a front left perspective view of an alternate frame and seating arrangement for front and rear row seats.
Figure 29:
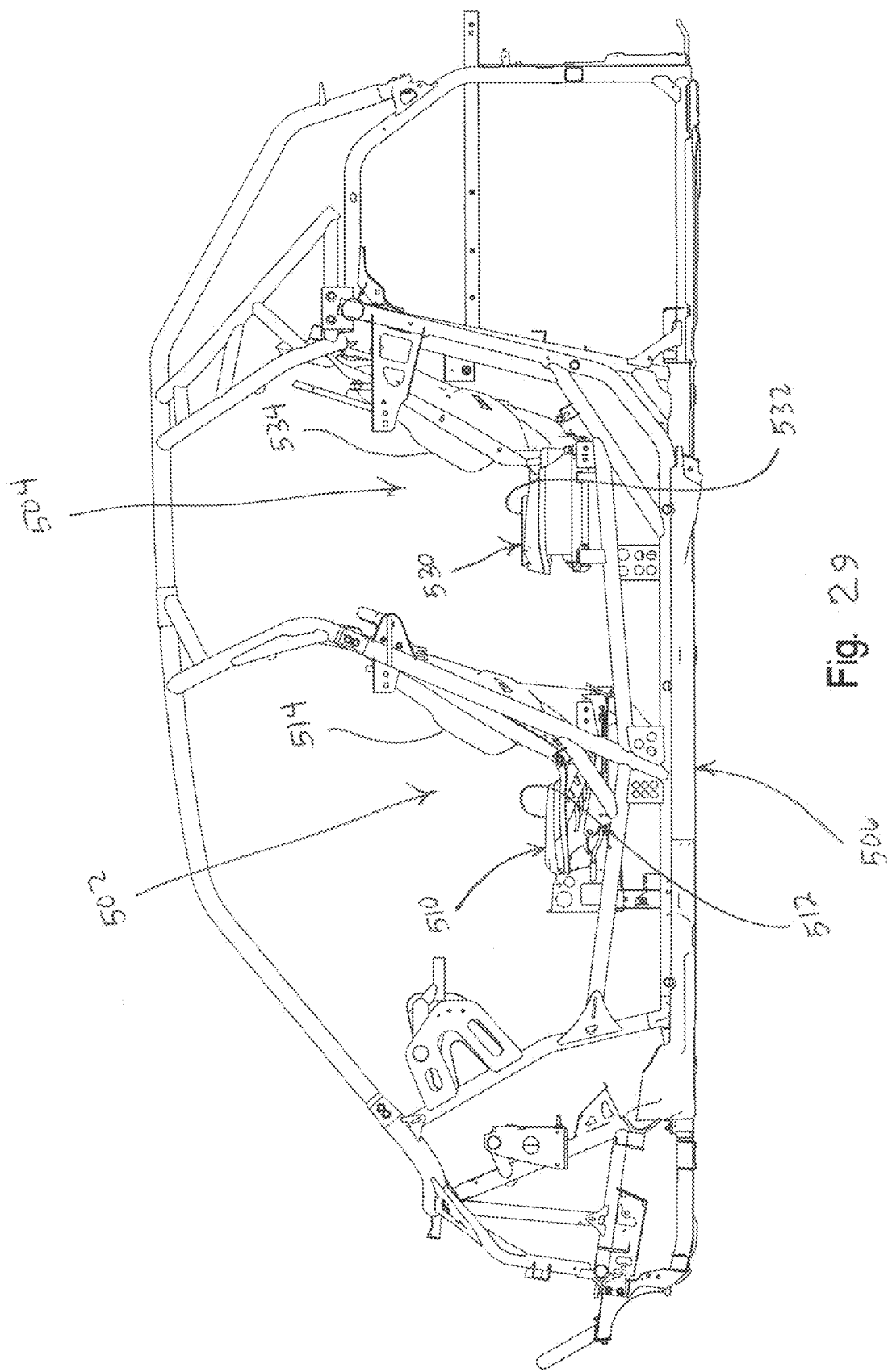
FIG. 29 is a side view of the vehicle of FIG. 28.

With reference now to FIGS. 28 and 29, another embodiment of a vehicle seating arrangement is shown where a front row 502 and a rear row 504 are coupled to a vehicle frame 506. The vehicle could be similar to U.S. Pat. No. 8,328,235 and/or and 9,393,894, the subject matter of which are incorporated herein by reference. Front row 502 includes driver seat 510 having a seat bottom 512 and a seat back 514. A front passenger seat is shown at 516 having a seat bottom 518 and a seat back 520.

With reference still to FIGS. 28 and 29, rear row 504 includes a rear left passenger seat 530 having a seat bottom 532 and a seat back 534. Rear right passenger seat is provided at 536 having a seat bottom 538 and a seat back 540. A jumpseat 544 may be provided intermediate rear seats 530 and 536, similar to any of the embodiments described above. As shown best in FIG. 28, the frame 506 has a front row seat frame 550 and a rear row seat frame 552. Front row seat frame may be similar to that shown and described in U.S. Patent application Ser. No. 62/615,684 filed Jan. 10, 2018, the subject matter of which is incorporated herein by reference.

Figure 30:
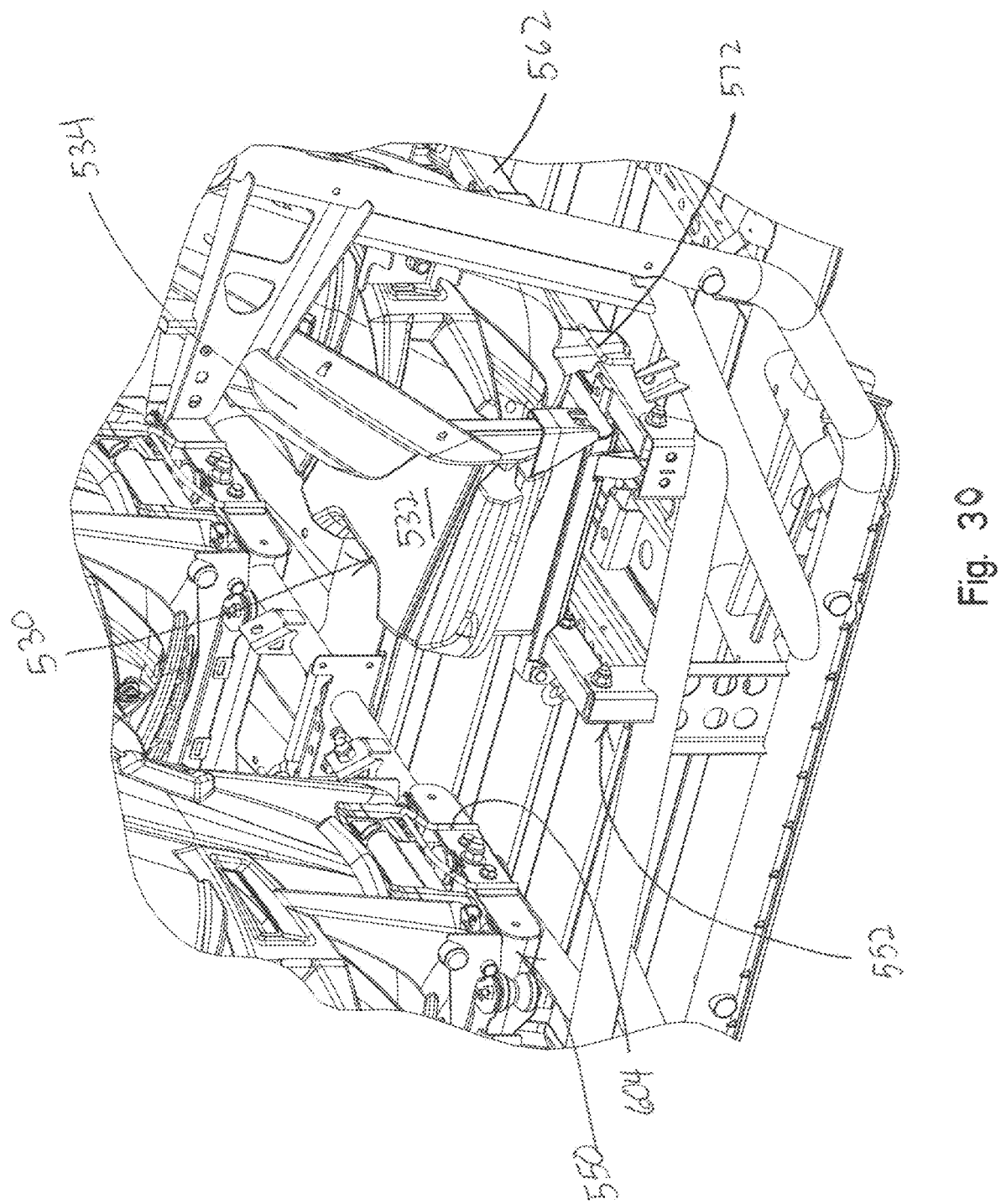
FIG. 30 is a left rear perspective view partially fragmented of the left rear seat.
Figure 31:
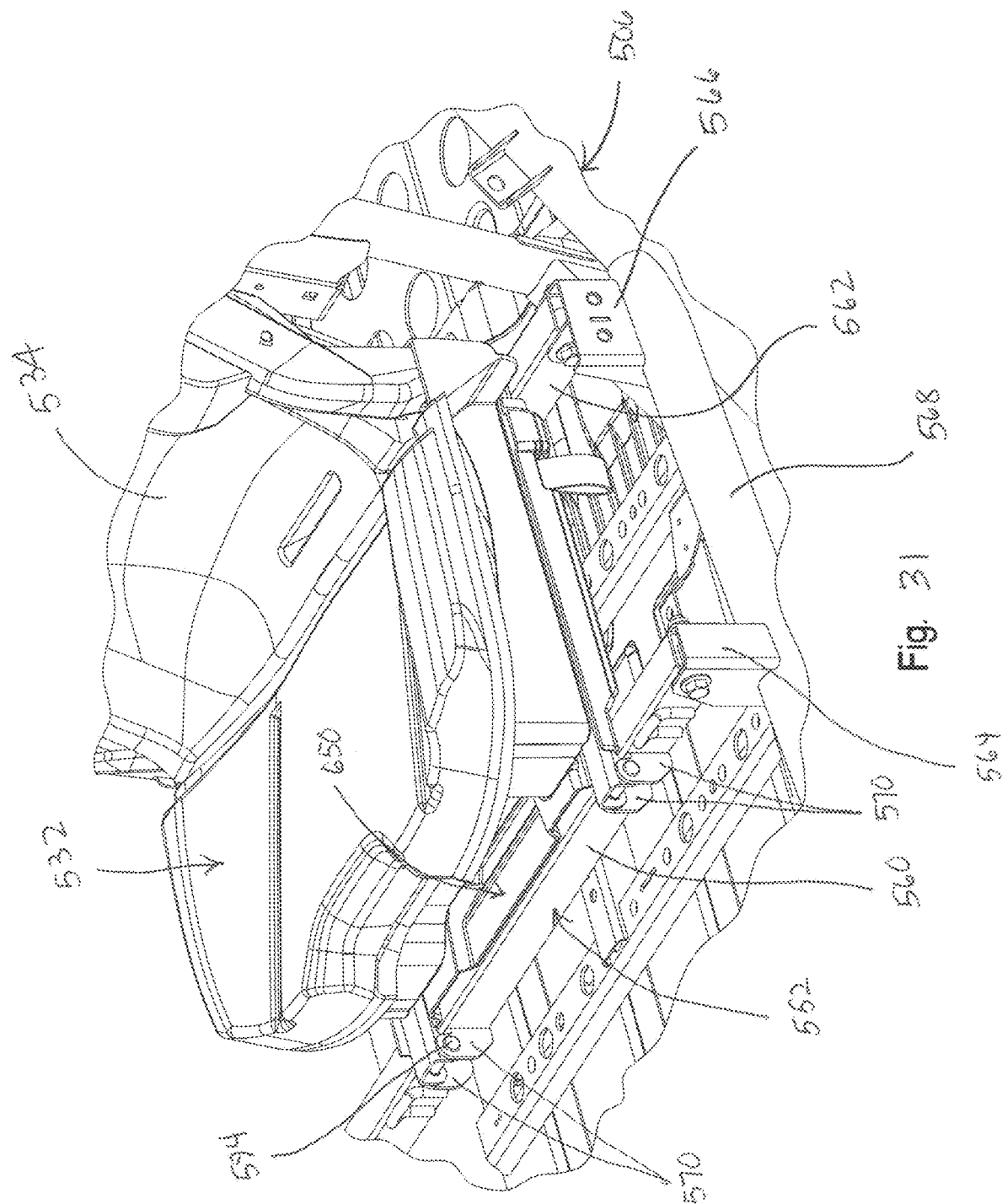
FIG. 31 is a front left perspective view of the rear left seat.
Figure 33:
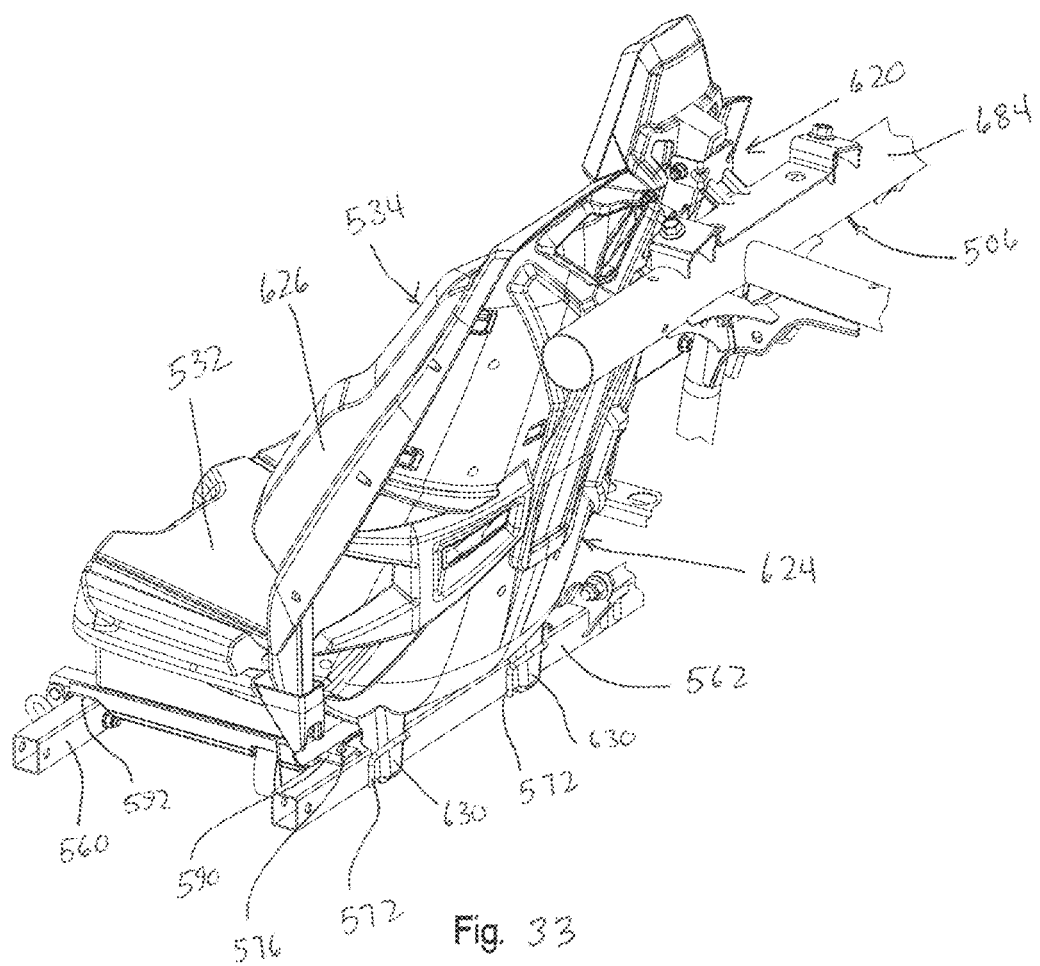
FIG. 33 shows the seat bottom coupled to the frame and the seat back coupled to the frame at a lower and upper position.
Figure 34:
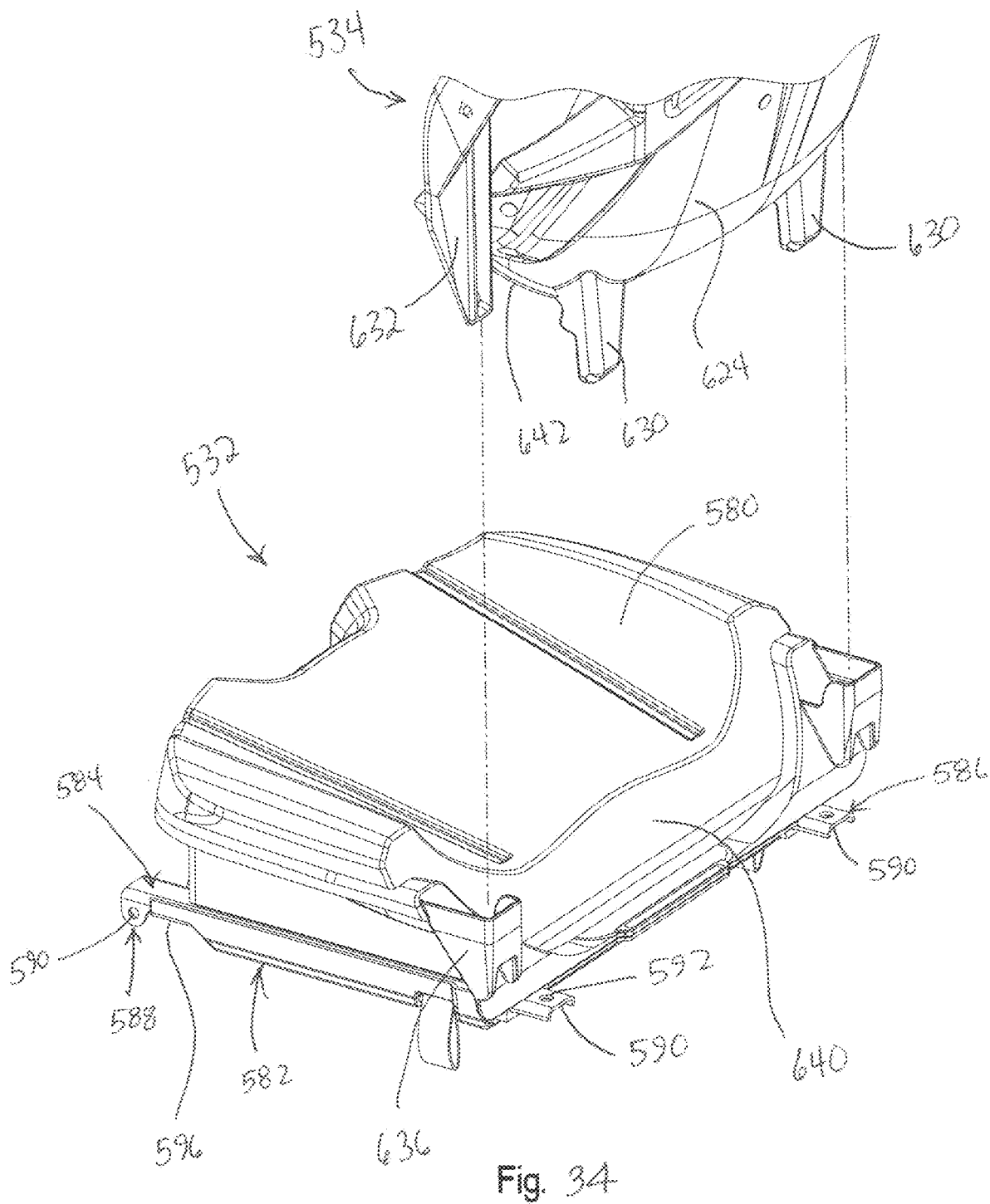
FIG. 34 shows the seat back lifted away from the seat bottom.

With reference now to FIGS. 30 and 31, the rear row seat frame 552 and rear left seat 530 will be described in greater detail. It should be understood that the right rear seat 536 operates in the same manner and is coupled to the rear row seat frame 552 in a similar manner, such that only the rear left seat 530 will be described. As shown, rear row seat frame 552 is defined by a front transverse tube 560 and a rear transverse tube 562. Front transverse tube 560 is supported by way of a pedestal 564 whereas rear transverse tube 562 is supported by a rear pedestal 566. Each of the pedestals 564 and 566 are coupled to a longitudinally extending frame tube 568 of frame 506. As shown best in FIG. 31, front transverse tube 560 includes front brackets 570 extending forwardly therefrom and defining a hinge 571 (FIG. 35) for seat bottom 532 as further described herein. As best shown in FIGS. 30 and 33, rear frame tube 562 includes wire-form loops 572 coupled thereto (for example, by way of welding to frame tube 562) and define an opening into which seat back 534 is nested as further described herein. Additionally, frame tube 562 may include alignment posts 576 (only one of which can be viewed in FIG. 33) for aligning seat bottom 532 to rear frame tube 562 as described further herein. With reference now to FIGS. 31 and 34, seat bottom 532 will be described in greater detail.

As shown in FIG. 34, seat bottom 532 includes a padded cushion portion 580 which is coupled to a rotatable frame 582. Frame 582 includes left and right frame brackets 584 and 586. Hinge 571 is defined in part by a front hinge portion 588 having an opening at 590 which as shown in FIG. 31 receives a pin 594 (FIG. 31) so as to be rotatable relative to front frame tube 560. Pin 594 defines a hinge axis 595. Each of the frame brackets 584 and 586 include a rear cantilevered portion 590 having an aperture at 592. With reference to FIG. 33, seat bottom 532 is shown in the seating position where cantilevered portions 590 sit on top of frame tube 562 so as to support seat bottom 532. Frame brackets 584 and 586 further include a notch at 596 (FIG. 34) for contact and support on front frame tube 560, as best shown in FIG. 33. As shown in FIGS. 33 and 34, alignment apertures 592 align with alignment posts 576 when in the seated position, as shown in FIG. 33. Thus as shown in FIGS. 30 and 32, seat bottom 532 is rotatable from the position shown in FIG. 30 to the position shown in FIG. 32 where cantilevered portion 590 is now supported by a support member 604 which is coupled to a backside of front seat support 550.

Figure 32:
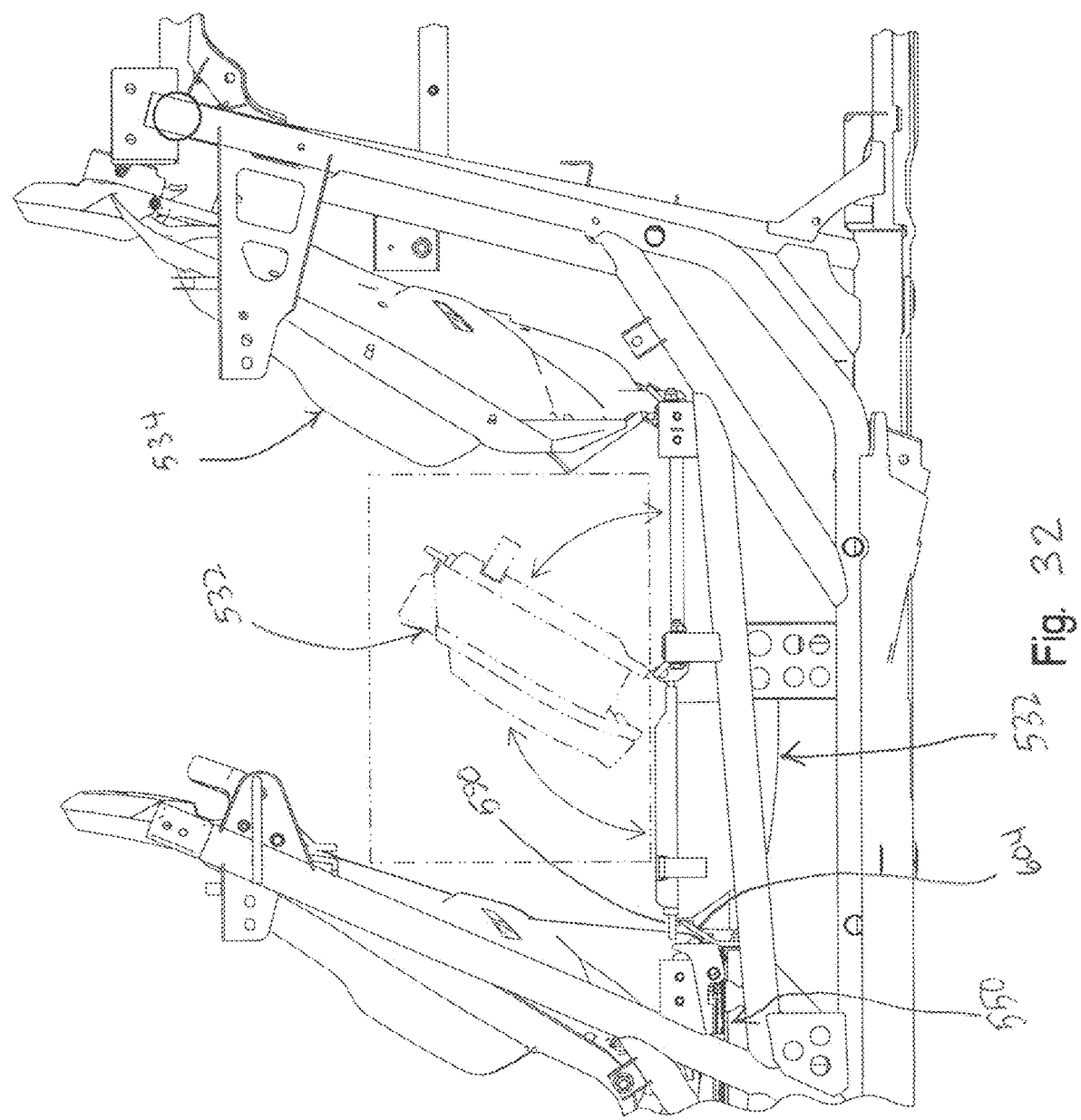
FIG. 32 shows the left rear seat bottom in a down position, and in a phantom view of partial rotation.

It should also be understood that seat back 534 is removed in order to rotate the seat bottom 532, as shown in FIG. 32. In order to accomplish this, seat back 534 includes a latching mechanism 620 (FIG. 33) as further described herein, which latches the seat back 534 to frame 506. As shown best in FIG. 33, seat back 534 includes a structural seat back frame 624 which could be a molded plastic material onto which a molded material or cushion 626 is adhered. Seat back frame 624 includes two feet 630 (FIG. 34) which position within the openings defined by wire-form loops 572 (FIG. 33) and arm portions (or stakes) 632 (FIG. 34) which are received within stake pockets 636 of seat bottom 532. As shown best in FIG. 34, seat bottom 532 includes an angled cushion surface 640 which is slanted upwardly and forwardly and conforms with a complimentary surface 642 on seat back 534. Thus, when in the position of FIG. 33, when seat back 534 is latched in place by way of latch mechanism 620, seat bottom 532 is fixed in place and cannot rotate due to the location of the seat back 534 relative to the seat bottom 532. Also, when in the position of FIG. 33, seat back 534 is located relative to both the frame and the seat bottom 532 by way of feet portions 630 and arm portions 632. Said differently, when in the cargo mode of FIG. 32 (when seat bottom 532 is rotated forwardly) the seat back can be held in position by way of the feet portions 630 positioned in wire-form loops 572 (FIG. 33). Furthermore, as shown best in FIG. 37, seat back 534 includes a hook 634 for temporarily holding the seat back 534 up and out of the way while the seat bottom 532 is rotated, as described further herein.

Figure 35:
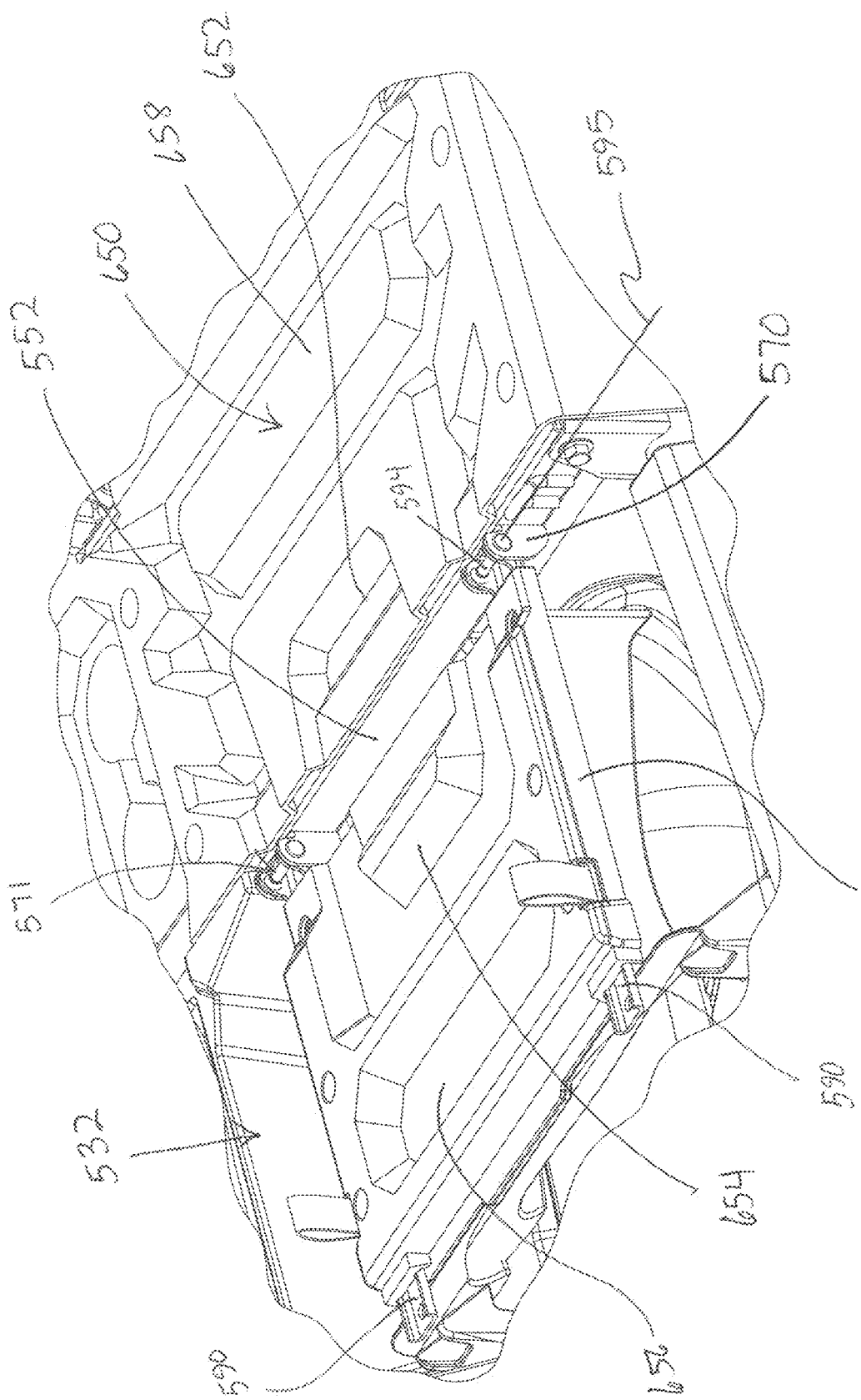
FIG. 35 shows the nesting configuration of the seat bottom when in a fully rotated open position.

As best shown in FIG. 35, seat frame 552 and seat bottom 532 can have a nesting configuration defined by corrugations defined in a seat pan 650 with corresponding protrusions and corrugations in seat bottom 532. For example, seat pan 650 includes a corrugation at 652 which corresponds to a protrusion in seat bottom at 654. Likewise, a corrugation at 656 in seat bottom 532 corresponds to a protrusion 658 in seat pan 650. Thus, structural rigidity can be added to the seat bottom 532 and the seat frame 552 without adding a vertical dimension seat bottom 532, that is, the seat is not raised relative to the frame in order to achieve the structural rigidity of the corrugations. The corrugations 652 and protrusions 654 also define a surface for storing cargo. That is, an upper extremity of the corrugations 656 and protrusions 658 define a planar surface with the hinge axis 595 is positioned below the planar surface so as to not interfere with the storage.

Figure 36:
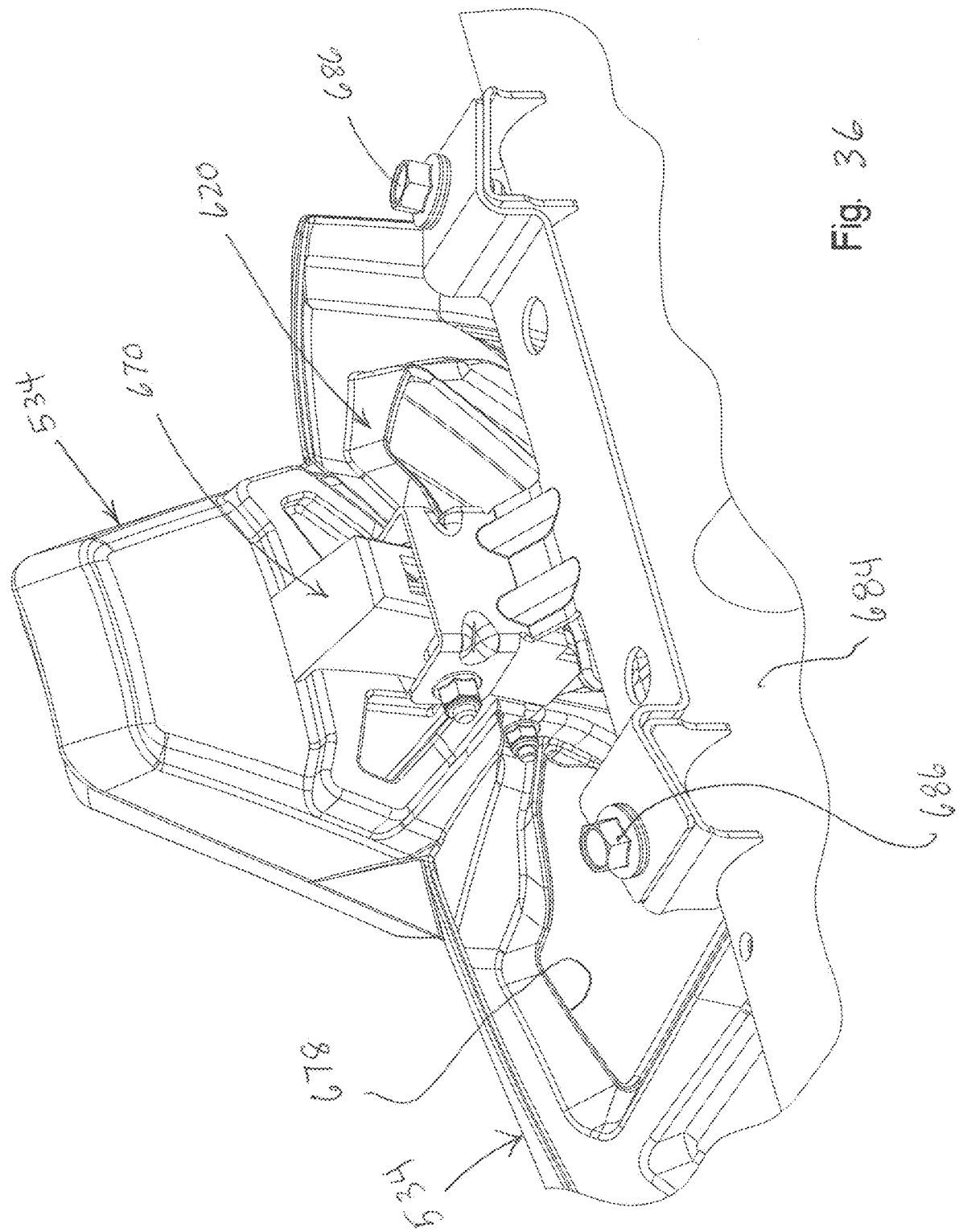
FIG. 36 shows an enlarged perspective view of the latch of the seat back in a latched position to the frame.
Figure 37:
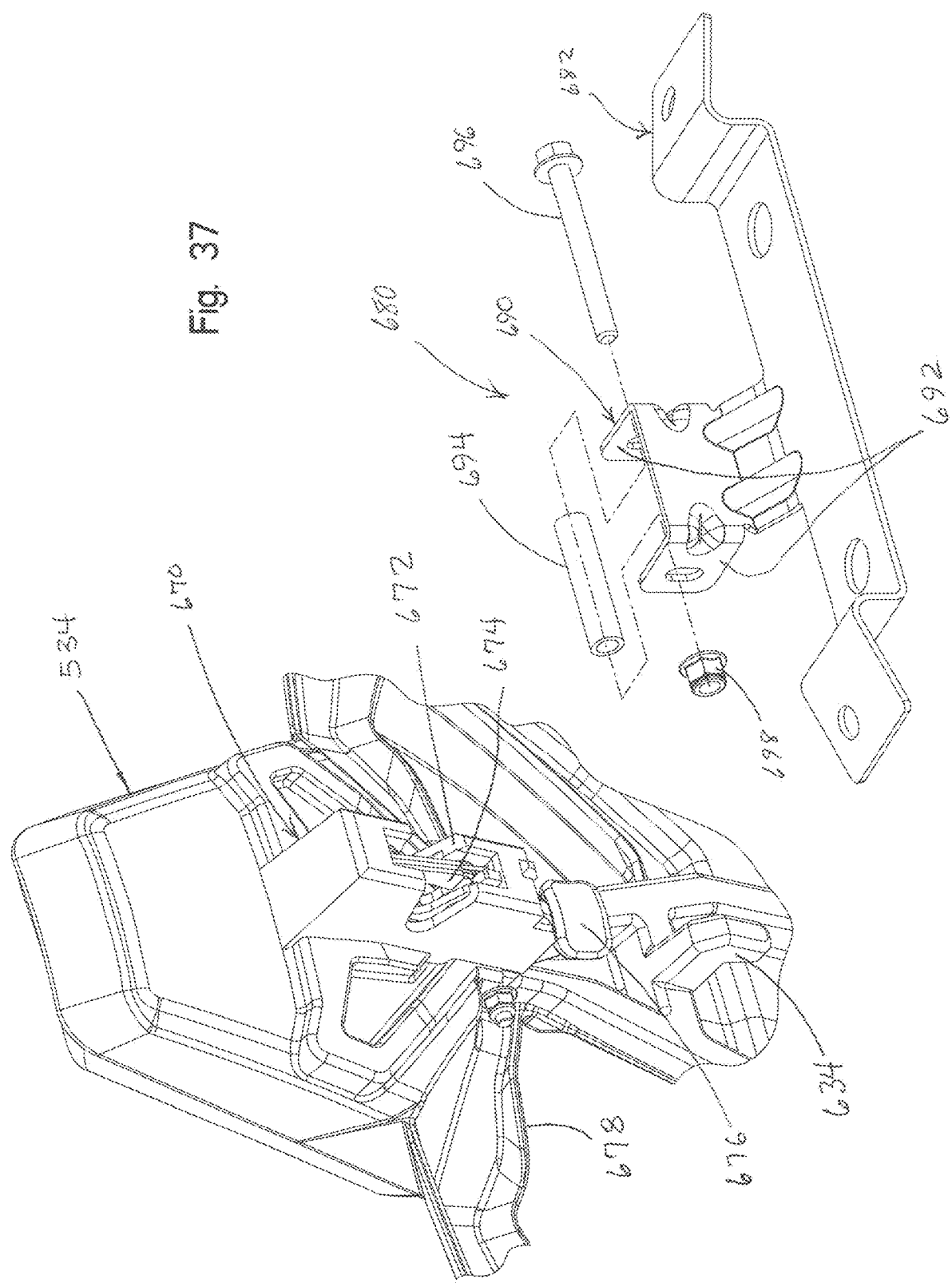
FIG. 37 shows the seat back having the latch attached to a back side thereof where the catch is in an exploded position.

With reference now to FIGS. 36 and 37, the latch assembly 620 will be described in greater detail. As shown in FIG. 36, a latch housing 670 is shown having a slot at 672 in which the latch lever 674 is mounted. A release lever 676 is provided which may release the latch lever 674. The release lever 676 is easily accessible through aperture 678 through the seat back 534. The latch 674 is similar to an automotive door type latch. Latch assembly 620 further includes a latch pin assembly 680 comprised of a bracket 682 which may be coupled to frame tube 684 by way of fasteners 686 and which provides a cantilevered bracket 690 having opposed flanges at 692 for receipt of a latch pin 694. A fastener 696 is received through plates 692 and through latch pin 694 and is held in place by fastener 698. Thus, moving slot 672 over latch pin 694 moves the latch pin 694 into a locked position with latch lever 674, whereas when release lever 676 is actuated, latch 674 releases pin 694 for removal of the seat back. Alternatively the entire latch pin assembly 680 could be in the form of a wire-form coupled to the frame tube 684. As mentioned before, seat back 534 includes a hook 634, and this hook may be hooked to latch pin 694 to temporarily hold the seat back 534 up during rotation of the seat bottom 532.

Figure 38:
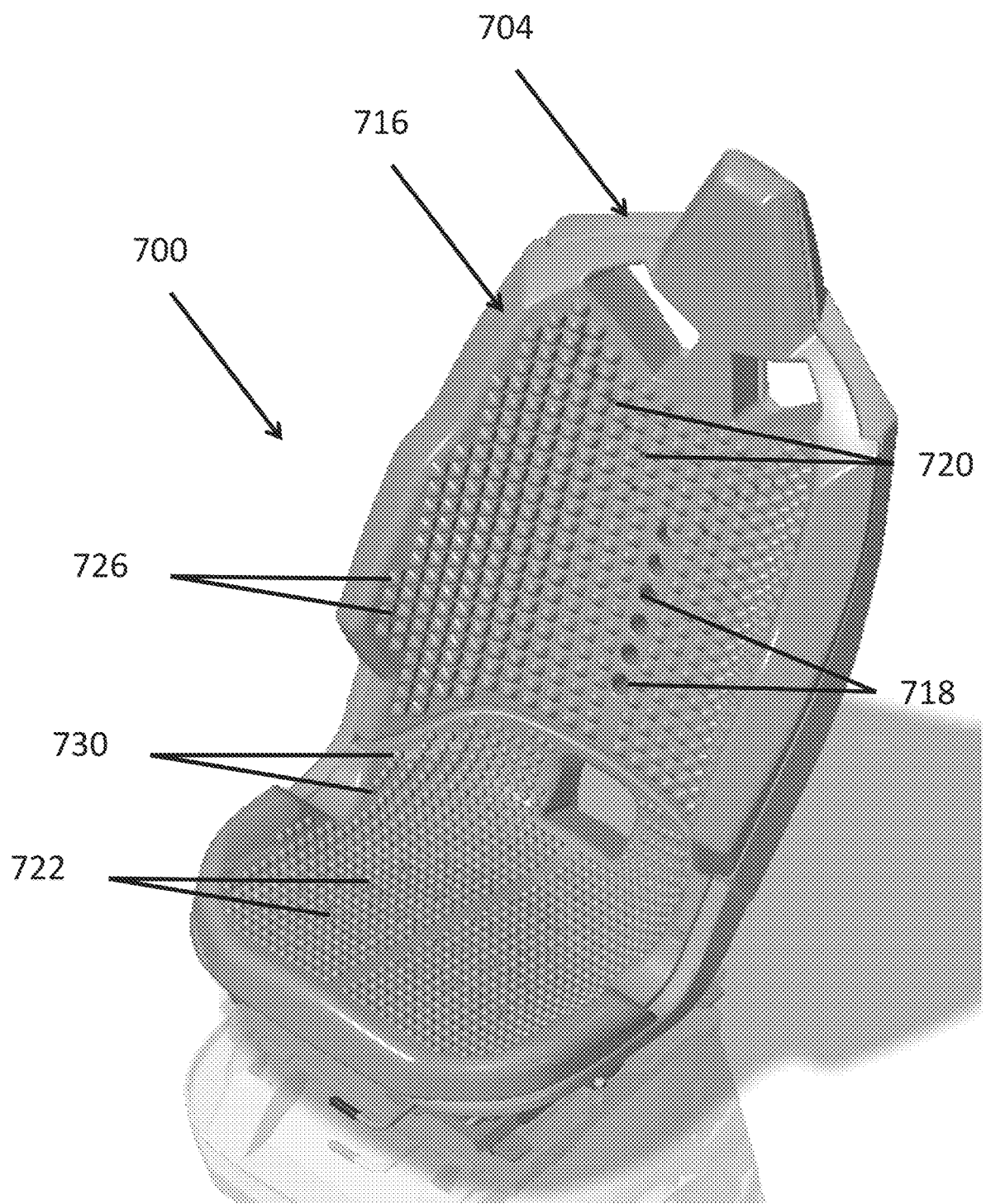
FIG. 38 shows an alternate ventilated seat to that shown in FIGS. 15 and 16.
Figure 39:
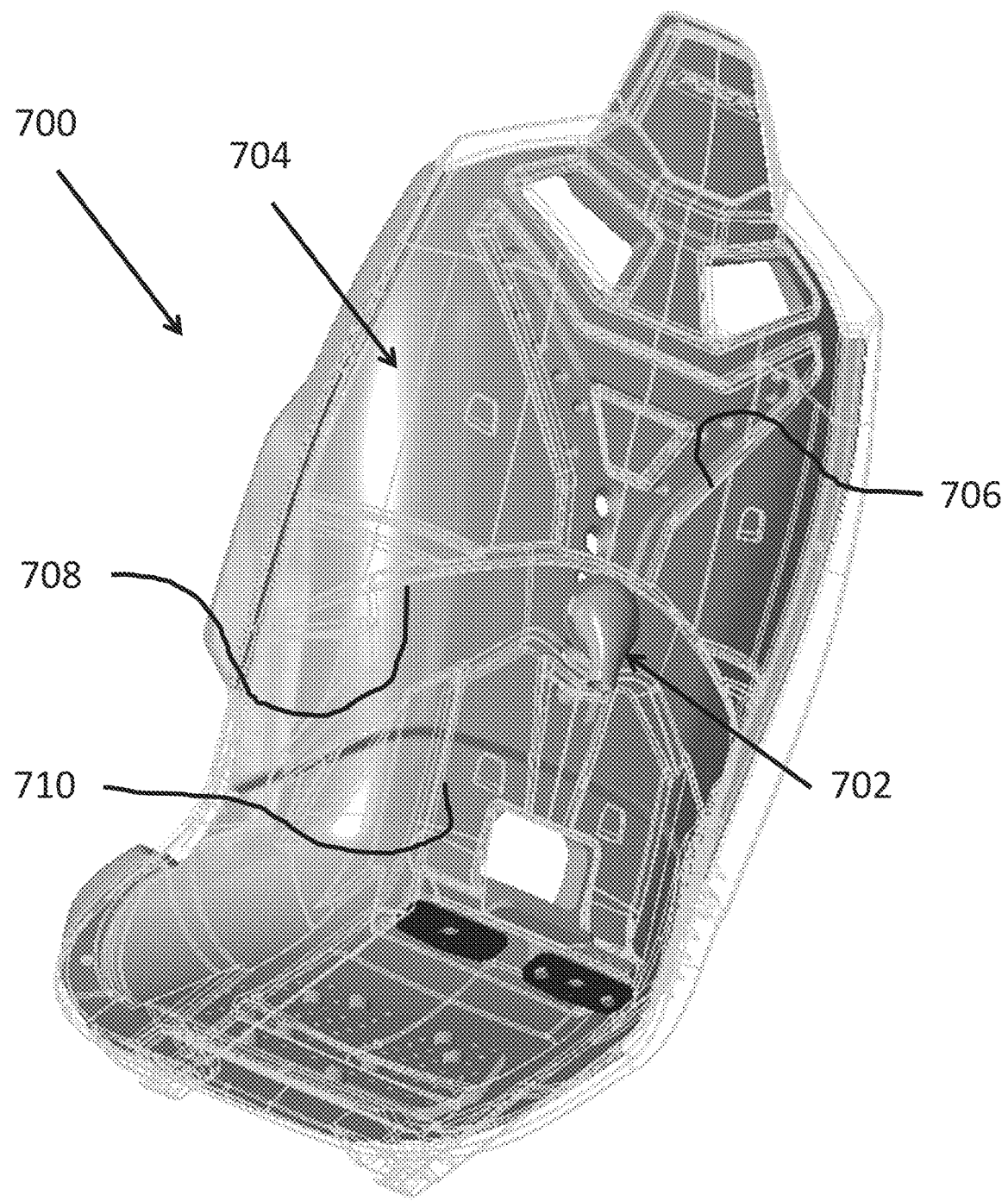
FIG. 39 shows a rear perspective view of the ventilated seat of FIG. 38.

As shown in FIGS. 38 and 39, a seat 700 is shown for air circulation which is an alternate embodiment to that shown in FIGS. 15 and 16. A fan (similar to fan 212, FIG. 16) is directly or indirectly coupled to one or more inlet ports 702 in the seat shell or seat chassis 704. Air is directed through channels 706, 708, 710 designed in the seat shell or chassis 704. Once the air enters the channels on the backside of the foam 716 it exits through air ports 718, 720, 722 to the front side of the foam. These air ports 718, 720, 722 are located to maximize circulation in key regions around the operator. For instance, a series of air ports might exist in the lumbar region or seat area.

Preferably, the A side of the foam 716 would include heavily textured or raised comfort and support features 726, 730 and are designed to not smash flat but rather keep the rider elevated above the base foam to provide the best circulation. This may be done by appropriate foam density or a skin applied over the foam to help it hold its shape. A layer of reticulated foam or even a cut and sew cover could be applied over the textured foam if the textured foam itself isn't the cosmetic surface of the seat.

The fans used to circulate the air could be remote mounted and connected with a hose or other duct in a manner where one or multiple seats could share the same air source. If multiple seats share the same air source, the air flow can be controlled to not supply air to unoccupied seats. The fan could also be coupled directly to the seat. The air could be cooled or heated by a multitude of methods prior to entering the seat. Ambient air could also be used, as circulation is the first step to improving comfort.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:
a frame;
a base panel coupled to the frame;
a movable panel hingedly coupled to the base panel; and
a vehicle seat including a seat back and seat bottom, the seat bottom having mounting arms coupled to the movable panel via fasteners, wherein the seat bottom is coupled to the movable panel, wherein the movable panel defines an open slot, wherein the movable panel defines a groove proximate the open slot, wherein the fastener extends through the open slot and is positioned within a profile of the groove, wherein the seat bottom includes a latch receiver having a receiver opening and a release lever, wherein the latch receiver is configured to couple and decouple from a latching peg, and wherein the latching peg extends from the seat back such that when the latching peg is coupled to the latch receiver, the seat back and seat bottom slide with one another and when the latching peg is decoupled from the latch receiver the seat bottom and seat back are independently laterally movable.

2. The vehicle of claim 1, wherein the base panel and the movable panel are coupled at a rotatable edge.

3. The vehicle of claim 2, wherein the rotatable edge is positioned at a forward portion of the base panel.

4. The vehicle of claim 1, wherein the mounting arms of the seat bottom and the fasteners are operable to move along the groove.

5. The vehicle of claim 4, wherein the fasteners are operable to fasten the seat bottom at a lateral position.

6. The vehicle of claim 1, wherein the base panel and the moveable panel define a substantially planar surface when the movable panel is rotated such that the seat bottom is facing downwardly.

7. The vehicle of claim 1, wherein the seat bottom and the seat back are configured such that the seat bottom is rotatable with the movable panel away from the seat back.

8. The vehicle of claim 7, wherein the seat back includes an arcuate lower edge and the seat bottom includes a complimentary arcuate upper edge.

9. The vehicle of claim 8, wherein the arcuate lower edge and the complimentary arcuate upper edge are defined along a radius relative to an axis of rotation of the movable panel.

* * * * *